United States Patent
Hamada et al.

(10) Patent No.: US 11,870,789 B2
(45) Date of Patent: Jan. 9, 2024

(54) DETECTION DEVICE, VEHICLE, DETECTION METHOD, AND DETECTION PROGRAM

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yoshihiro Hamada, Osaka (JP); Hiroshi Ueda, Yokkaichi (JP); Naoki Adachi, Yokkaichi (JP); Shinichi Aiba, Yokkaichi (JP); Shogo Kamiguchi, Yokkaichi (JP); Fumiya Ishikawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 121 days.

(21) Appl. No.: 17/622,086

(22) PCT Filed: May 19, 2020

(86) PCT No.: PCT/JP2020/019713
§ 371 (c)(1),
(2) Date: Dec. 22, 2021

(87) PCT Pub. No.: WO2021/065069
PCT Pub. Date: Apr. 8, 2021

(65) Prior Publication Data
US 2022/0255954 A1  Aug. 11, 2022

(30) Foreign Application Priority Data

Sep. 30, 2019 (JP) ................................ 2019-178176

(51) Int. Cl.
*H04L 9/40* (2022.01)
*B60R 16/023* (2006.01)
*H04L 67/12* (2022.01)

(52) U.S. Cl.
CPC ........ *H04L 63/1416* (2013.01); *B60R 16/023* (2013.01); *H04L 67/12* (2013.01)

(58) Field of Classification Search
CPC .......................... H04L 63/1416; B60R 16/023
See application file for complete search history.

(56) References Cited

U.S. PATENT DOCUMENTS 11,575,538 B2 * 2/2023 Takahashi ............. G06F 21/552
2010/0118721 A1 5/2010 Sakurada et al.
(Continued)

FOREIGN PATENT DOCUMENTS

CN 101636972 A 1/2010
JP 2014-146868 A 8/2014
(Continued)

OTHER PUBLICATIONS

The U.S. Appl. No. 17/622,122, filed Dec. 22, 2021 in the name of Yoshihiro Hamada et al.
(Continued)

*Primary Examiner* — Kostas J Katsikis
(74) *Attorney, Agent, or Firm* — Oliff PLC

(57) ABSTRACT

An unauthorized message in an in-vehicle network is more accurately detected. A detection device includes: a monitoring unit configured to monitor, as target messages, an authorized message being periodically transmitted and the unauthorized message in the in-vehicle network, and monitor a reference message being periodically transmitted; a (Continued)

calculation unit configured to, based on a monitoring result of the monitoring unit, calculate a time difference between a time corresponding to a transmission time of the target message and a time corresponding to a transmission time of the reference message; and a detection unit configured to, based on the time difference calculated by the calculation unit, perform a detection process of detecting the unauthorized message.

7 Claims, 20 Drawing Sheets

(56) References Cited

U.S. PATENT DOCUMENTS

| | | |
|---|---|---|
| 2015/0358351 A1 | 12/2015 | Otsuka et al. |
| 2017/0324579 A1 | 11/2017 | Takada et al. |
| 2018/0144119 A1 | 5/2018 | Kishikawa et al. |
| 2018/0314571 A1* | 11/2018 | Tanabe ............... H04L 63/1425 |
| 2019/0149561 A1* | 5/2019 | Maeda ................ B60R 16/0232 726/23 |
| 2019/0149562 A1 | 5/2019 | Maeda et al. |
| 2021/0178995 A1 | 6/2021 | Koyama et al. |

FOREIGN PATENT DOCUMENTS

| | | | |
|---|---|---|---|
| JP | 2018-182725 A | 11/2018 | |
| JP | 2018182724 A * | 11/2018 | ........... B60R 16/023 |
| WO | 2016/080422 A1 | 5/2016 | |
| WO | 2017/038005 A1 | 3/2017 | |
| WO | 2018/186054 A1 | 10/2018 | |
| WO | 2019/102911 A1 | 5/2019 | |
| WO | WO-2021065068 A1 * | 4/2021 | .......... H04W 12/106 |

OTHER PUBLICATIONS

Sep. 8, 2023 Notice of Allowance issued in U.S. Appl. No. 17/622,122.

Jun. 12, 2023 Notice of Allowance issued in U.S. Appl. No. 17/622,122.

* cited by examiner

FIG. 12

| RECEPTION TIME tbq(SEC) OF REFERENCE MESSAGE | RECEPTION TIME tap(SEC) OF TARGET MESSAGE | TIME DIFFERENCE Xp (SEC) | NUMBER OF SAMPLES OF REFERENCE MESSAGE RECEPTION TIMES TO BE USED FOR ABNORMALITY DETECTION |
|---|---|---|---|
| 0 | 2 | 2 | |
| 3 | | | |
| 6 | | | |
| 9 | 9 | 0 | 3 |
| 12 | | | |
| 15 | 16 | 1 | 2 |
| 18 | | | |
| 21 | 23 | 2 | 2 |
| 24 | | | |
| 27 | | | |
| 30 | 30 | 0 | 3 |
| 33 | | | |
| 36 | 37 | 1 | 2 |
| 39 | | | |
| ⋮ | ⋮ | ⋮ | ⋮ |

FIG. 13

| RECEPTION TIME tbq(SEC) OF REFERENCE MESSAGE | RECEPTION TIME tap(SEC) OF TARGET MESSAGE | TIME DIFFERENCE Xp (SEC) | NUMBER OF SAMPLES OF REFERENCE MESSAGE RECEPTION TIMES TO BE USED FOR ABNORMALITY DETECTION |
|---|---|---|---|
| 0 | 0 | 0 | |
| | 3 | | |
| | 6 | | |
| 7 | 9 | 2 | 3 |
| | 12 | | |
| 14 | 15 | 1 | 2 |
| | 18 | | |
| 21 | 21 | 0 | 2 |
| | 24 | | |
| | 27 | | |
| 28 | 30 | 2 | 3 |
| | 33 | | |
| 35 | 36 | 1 | 2 |
| | 39 | | |
| ⋮ | ⋮ | ⋮ | ⋮ |

FIG. 14

| RECEPTION TIME tbq(SEC) OF REFERENCE MESSAGE | RECEPTION TIME tap(SEC) OF TARGET MESSAGE | TIME DIFFERENCE Xp(SEC) | VIRTUAL RECEPTION TIME tvb |
|---|---|---|---|
| 0 | 0 | 0 | |
| | 3 | | |
| | 6 | | |
| 7 | 9 | 2 | |
| | 12 | | |
| 14 | 15 | 1 | |
| | 18 | | 17(14+3×1) |
| 21 | 21 | 0 | 21(21+3×0) |
| | 24 | | 24(21+3×1) |
| | 27 | | 27(21+3×2) |
| 28 | 30 | 2 | 28(28+3×0) |
| | 33 | | 31(28+3×1) |
| 35 | 36 | 1 | 35(35+3×0) |
| | 39 | | 38(35+3×1) |
| ⋮ | ⋮ | ⋮ | ⋮ |

DETECTION DEVICE, VEHICLE, DETECTION METHOD, AND DETECTION PROGRAM

TECHNICAL FIELD

The present disclosure relates to a detection device, a vehicle, a detection method, and a detection program.

This application claims priority on Japanese Patent Application No. 2019-178176 filed on Sep. 30, 2019, the entire content of which is incorporated herein by reference.

BACKGROUND ART

PATENT LITERATURE 1 (Japanese Laid-Open Patent Publication No. 2014-146868) discloses a network device as follows. That is, the network device includes a communication unit that receives data, a time management unit that manages a reception time at which the data is received, and a control unit that processes the received data. The network device periodically receives data and processes the data. The control unit records a reception time in the time management unit for each of identifiers possessed by the data received by the communication unit. In a case where first data, which has the same identifier as reference data and whose reception interval is shorter than a predetermined period, has been received, and then if second data having the same identifier as the first data is received until the predetermined period elapses from when the reference data is received, the control unit performs a period abnormality detection process. If data having the same identifier as the first data has not been received until the predetermined period elapses, the control unit performs a predetermined process for the first data.

Meanwhile, PATENT LITERATURE 2 (Japanese Laid-Open Patent Publication No. 2018-182725) discloses an unauthorized communication detection reference determination method. That is, the unauthorized communication detection reference determination method is a method, to be executed in an information processing system including a storage unit, for determining a reference message to be used for detecting an unauthorized communication in an in-vehicle network system including a network and one or more electronic control units connected to the network. This method includes: a communication pattern identification step of identifying, from information related to an attack message to the in-vehicle network system, a communication pattern indicating the feature of the attack message; a communication pattern determination step of determining whether or not a message sent to the network conforms to the communication pattern identified in the communication pattern identification step; and a reference message determination step of determining a reference message, which is used as a reference in determining whether or not the message sent to the network is an attack message, by using the determination result in the communication pattern determination step.

CITATION LIST

Patent Literature

PATENT LITERATURE 1: Japanese Laid-Open Patent Publication No. 2014-146868
PATENT LITERATURE 2: Japanese Laid-Open Patent Publication No. 2018-182725

SUMMARY OF INVENTION

A detection device of the present disclosure is configured to detect an unauthorized message in an in-vehicle network, and includes: a monitoring unit configured to monitor, as target messages, an authorized message being periodically transmitted and the unauthorized message in the in-vehicle network, and monitor a reference message being periodically transmitted; a calculation unit configured to, based on a monitoring result of the monitoring unit, calculate a time difference between a time corresponding to a transmission time of the target message and a time corresponding to a transmission time of the reference message; and a detection unit configured to, based on the time difference calculated by the calculation unit, perform a detection process of detecting the unauthorized message.

A detection method of the present disclosure is performed in a detection device configured to detect an unauthorized message in an in-vehicle network, and includes: monitoring, as target messages, an authorized message being periodically transmitted and the unauthorized message in the in-vehicle network, and monitoring a reference message being periodically transmitted; based on a monitoring result, calculating a time difference between a time corresponding to a transmission time of the target message and a time corresponding to a transmission time of the reference message; and based on the calculated time difference, performing a detection process of detecting the unauthorized message.

A detection program of the present disclosure is used in a detection device configured to detect an unauthorized message in an in-vehicle network, and causes a computer to function as: a monitoring unit configured to monitor, as target messages, an authorized message being periodically transmitted and the unauthorized message in the in-vehicle network, and monitor a reference message being periodically transmitted; a calculation unit configured to, based on a monitoring result of the monitoring unit, calculate a time difference between a time corresponding to a transmission time of the target message and a time corresponding to a transmission time of the reference message; and a detection unit configured to, based on the time difference calculated by the calculation unit, perform a detection process of detecting the unauthorized message.

One mode of the present disclosure can be realized as a semiconductor integrated circuit that realizes a part or the entirety of the detection device, or can be realized as a system including the detection device. Moreover, one mode of the present disclosure can be realized as a semiconductor integrated circuit that realizes a part or the entirety of the system including the detection device, or can be realized as a program that causes a computer to execute process steps in the system including the detection device.

BRIEF DESCRIPTION OF DRAWINGS

FIG. 12 shows an example of a relationship between reception times of target messages and reception times of reference messages in the in-vehicle communication system according to the embodiment of the present disclosure.

FIG. 13 shows another example of a relationship between reception times of target messages and reception times of reference messages in the in-vehicle communication system according to the embodiment of the present disclosure.

FIG. 14 shows another example of a relationship between reception times of target messages and reception times of reference messages in the in-vehicle communication system according to the embodiment of the present disclosure.

DESCRIPTION OF EMBODIMENTS

Figure 1:
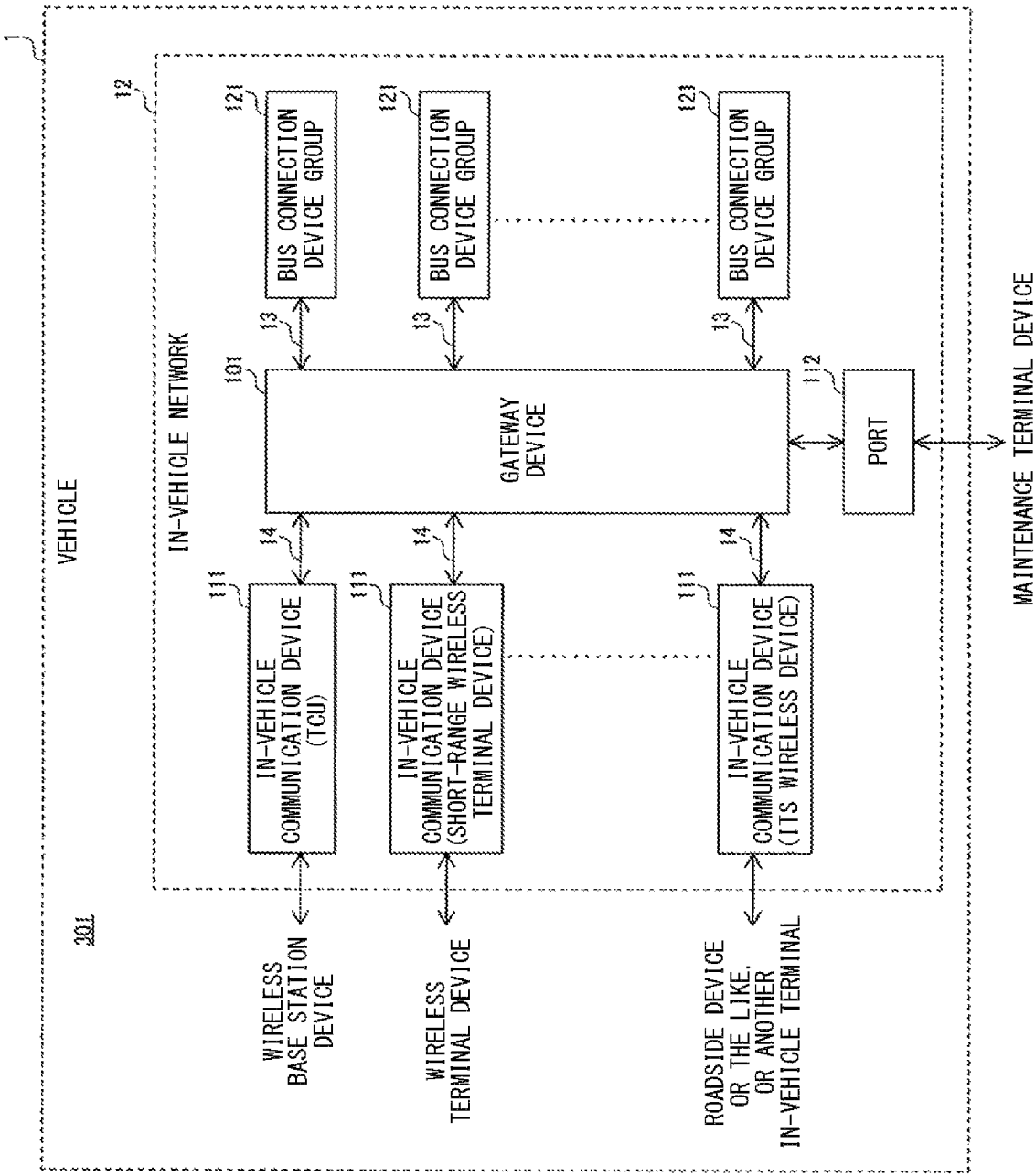
FIG. 1 shows a configuration of an in-vehicle communication system according to an embodiment of the present disclosure.

To date, a technology for improving security in an in-vehicle network has been developed.

Problems to be Solved by the Present Disclosure

A technology enabling more accurate detection of an unauthorized message in an in-vehicle network is desired beyond the technologies described in PATENT LITERATURE 1 and PATENT LITERATURE 2.

The present disclosure is made to solve the above problem, and an object of the present disclosure is to provide a detection device, a vehicle, a detection method, and a detection program capable of more accurately detecting an unauthorized message in an in-vehicle network.

Effects of the Present Disclosure

According to the present disclosure, it is possible to more accurately detect an unauthorized message in an in-vehicle network.

DESCRIPTION OF EMBODIMENT OF THE PRESENT DISCLOSURE

First, contents of embodiments of the present disclosure are listed and described.

(1) A detection device according to an embodiment of the present disclosure is configured to detect an unauthorized message in an in-vehicle network, and includes: a monitoring unit configured to monitor, as target messages, an authorized message being periodically transmitted and the unauthorized message in the in-vehicle network, and monitor a reference message being periodically transmitted; a calculation unit configured to, based on a monitoring result of the monitoring unit, calculate a time difference between a time corresponding to a transmission time of the target message and a time corresponding to a transmission time of the reference message; and a detection unit configured to, based on the time difference calculated by the calculation unit, perform a detection process of detecting the unauthorized message.

In the above configuration, since the detection process is performed based on the time difference between the time corresponding to the transmission time of the target message and the time corresponding to the transmission time of the reference message, the detection process can be performed using as a reference the time corresponding to the transmission time of the reference message. Thus, it is possible to avoid occurrence of erroneous detection due to the detection process performed using as a reference a reception time of an unauthorized message included in target messages. Therefore, it is possible to more accurately detect an unauthorized message in the in-vehicle network.

(2) Preferably, the authorized message and the reference message have different transmission cycles. As the detection process, the detection unit determines whether or not the target message is an unauthorized message, according to a criterion, and the detection unit performs the detection process while switching a plurality of criteria.

In the above configuration, the detection process can be performed in response to change in the time difference based on the transmission cycle of the authorized message and the transmission cycle of the reference message, while switching the plurality of criteria. Therefore, it is possible to realize a flexible detection process in which periodic messages in various transmission cycles can be used as reference messages.

(3) More preferably, the number of criteria to be used by the detection unit in the detection process is determined based on a least common multiple between the transmission cycle of the authorized message and the transmission cycle of the reference message, and on the transmission cycle of the authorized message.

In the above configuration, it is possible to determine whether or not the target message is an unauthorized message, according to any of the plurality of criteria, in response to the magnitude of the time difference based on the difference between the transmission cycle of the authorized message and the transmission cycle of the reference message. Therefore, for example, determination as to whether or not a target message is an unauthorized message can be performed for all the target messages.

(4) Preferably, the detection device further includes an abnormality detection unit configured to detect an abnormality of the reference message, based on the monitoring result of the monitoring unit, and when detecting an abnormality, perform a predetermined process.

In the above configuration, when an abnormality of the reference message has been detected, for example, it is possible to prevent a detection process using as a reference the time corresponding to the transmission time of this reference message from being performed, whereby occurrence of erroneous detection can be inhibited.

(5) Preferably, the detection unit detects an abnormality regarding a first target message on the basis of: a time difference between a time corresponding to a transmission time of the first target message that is the target message and the time corresponding to the transmission time of the reference message; and a time difference between a time corresponding to a transmission time of a second target message that is the target message transmitted after the first target message and the time corresponding to the transmission time of the reference message.

In the above configuration, for example, in a case where a plurality of target messages are transmitted within a time period in which the target messages are determined to be normal using as a reference the time corresponding to the transmission time of the reference message, for example, even if the plurality of target messages actually including an unauthorized message are erroneously determined as authorized messages, the detection unit can determine that there is a possibility that the plurality of target messages are abnormal. Thus, for example, gray decision can be made on the unauthorized message that could not be detected in the detection process.

(6) Preferably, the monitoring unit monitors the target message received by the detection device and the reference message received by the detection device. As the detection process, the detection unit determines whether or not the target message is an unauthorized message, according to a criterion. The criterion is set based on a jitter caused by an oscillator in an in-vehicle device that transmits the reference message, and on a jitter caused by an oscillator in the detection device.

In the above configuration, for example, a more accurate detection process can be performed based on the criterion taking into consideration an error, in the message transmission time, based on the jitter caused by the oscillator in the in-vehicle device, and an error, in the message reception time, based on the jitter caused by the oscillator in the detection device.

(7) A vehicle according to the embodiment of the present disclosure is provided with the detection device.

In the above configuration, in the vehicle provided with the detection device, it is possible to more accurately detect an unauthorized message in the in-vehicle network.

(8) A detection method according to the embodiment of the present disclosure is performed in a detection device configured to detect an unauthorized message in an in-vehicle network, and includes: monitoring, as target messages, an authorized message being periodically transmitted and the unauthorized message in the in-vehicle network, and monitoring a reference message being periodically transmitted; based on a monitoring result, calculating a time difference between a time corresponding to a transmission time of the target message and a time corresponding to a transmission time of the reference message; and based on the calculated time difference, performing a detection process of detecting the unauthorized message.

In the above method, since the detection process is performed based on the time difference between the time corresponding to the transmission time of the target message and the time corresponding to the transmission time of the reference message, the detection process can be performed using as a reference the time corresponding to the transmission time of the reference message. Thus, it is possible to avoid occurrence of erroneous detection due to the detection process performed using as a reference a reception time of an unauthorized message included in target messages. Therefore, it is possible to more accurately detect an unauthorized message in the in-vehicle network.

(9) A detection program according to the embodiment of the present disclosure is used in a detection device configured to detect an unauthorized message in an in-vehicle network, and causes a computer to function as: a monitoring unit configured to monitor, as target messages, an authorized message being periodically transmitted and the unauthorized message in the in-vehicle network, and monitor a reference message being periodically transmitted; a calculation unit configured to, based on a monitoring result of the monitoring unit, calculate a time difference between a time corresponding to a transmission time of the target message and a time corresponding to a transmission time of the reference message; and a detection unit configured to, based on the time difference calculated by the calculation unit, perform a detection process of detecting the unauthorized message.

In the above configuration, since the detection process is performed based on the time difference between the time corresponding to the transmission time of the target message and the time corresponding to the transmission time of the reference message, the detection process can be performed using as a reference the time corresponding to the transmission time of the reference message. Thus, it is possible to avoid occurrence of erroneous detection due to the detection process performed using as a reference a reception time of an unauthorized message included in target messages. Therefore, it is possible to more accurately detect an unauthorized message in the in-vehicle network.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

[Configuration and Basic Operation]

FIG. 1 shows a configuration of an in-vehicle communication system according to an embodiment of the present disclosure.

With reference to FIG. 1, an in-vehicle communication system 301 includes a gateway device 101, a plurality of in-vehicle communication devices 111, and a plurality of bus connection device groups 121. The gateway device 101 is an example of a detection device. The in-vehicle communication system 301 is mounted in a vehicle 1.

Figure 2:
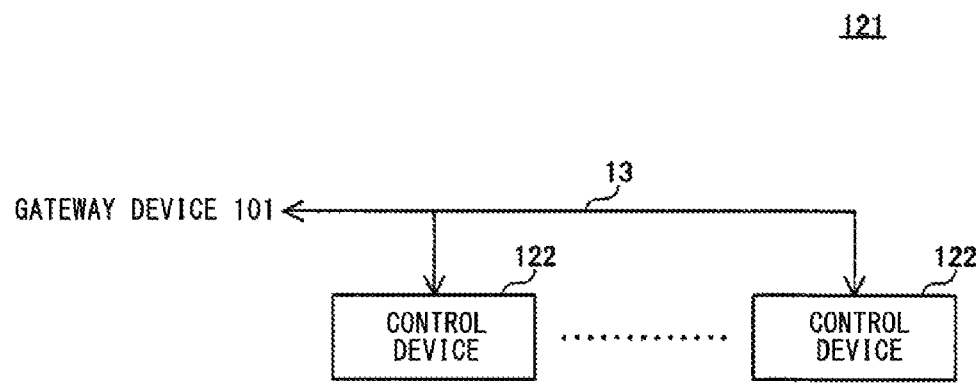
FIG. 2 shows a configuration of a bus connection device group according to the embodiment of the present disclosure.

FIG. 2 shows a configuration of a bus connection device group according to the embodiment of the present disclosure.

With reference to FIG. 2, the bus connection device group 121 includes a plurality of control devices 122. The bus connection device group 121 may not necessarily include a plurality of control devices 122, and may include one control device 122.

An in-vehicle network 12 includes a plurality of in-vehicle devices that are devices provided inside the vehicle 1. Specifically, the in-vehicle network 12 includes a plurality of in-vehicle communication devices 111 and a plurality of control devices 122, which are examples of the in-vehicle devices. As long as the in-vehicle network 12 includes a plurality of in-vehicle devices, the in-vehicle network 12 may be configured to include a plurality of in-vehicle communication devices 111 and not to include any control device 122, may be configured not to include any in-vehicle communication device 111 and to include a plurality of control devices 122, or may be configured to include one in-vehicle communication device 111 and one control device 122.

In the in-vehicle network 12, the in-vehicle communication device 111 communicates with a device outside the vehicle 1, for example. Specifically, the in-vehicle communication device 111 is a TCU (Telematics Communication Unit), a short-range wireless terminal device, or an ITS (Intelligent Transport Systems) wireless device, for example.

The TCU can perform wireless communication with a wireless base station device in accordance with a communication standard such as LTE (Long Term Evolution) or 3G, and can perform communication with the gateway device 101, for example. The TCU relays information to be used in services such as navigation, vehicle burglar prevention, remote maintenance, and FOTA (Firmware Over The Air), for example.

For example, the short-range wireless terminal device can perform wireless communication with a wireless terminal device such as a smartphone held by a person in the vehicle 1, i.e., an occupant, in accordance with a communication standard such as Wi-Fi (registered trademark) and Bluetooth (registered trademark), and can perform communication with the gateway device 101. The short-range wireless terminal device relays information to be used in a service such as entertainment, for example.

For example, the short-range wireless terminal device can perform wireless communication with a wireless terminal device such as a smart key held by the occupant and with a wireless terminal device provided at a tire, in accordance with a predetermined communication standard by using a radio wave in an LF (Low Frequency) band or a UHF (Ultra High Frequency) band, and can perform communication with the gateway device 101. The short-range wireless terminal device relays information to be used in services such as smart entry and TPMS (Tire Pressure Monitoring System), for example.

The ITS wireless device can perform roadside-to-vehicle communication with a roadside device, such as an optical beacon, a radio wave beacon, or an ITS spot, provided in the vicinity of a road, can perform vehicle-to-vehicle communication with an in-vehicle terminal mounted in another vehicle, and can perform communication with the gateway device 101, for example. The ITS wireless device relays information to be used in services such as congestion alleviation, safe driving support, and route guidance, for example.

The gateway device 101 can, via a port 112, transmit/receive data for update or the like of firmware, and data accumulated by the gateway device 101 to/from a maintenance terminal device outside the vehicle 1, for example.

The gateway device 101 is connected to in-vehicle devices via buses 13, 14, for example. Specifically, each bus 13, 14 is a bus according to, for example, a standard of CAN (Controller Area Network) (registered trademark), FlexRay (registered trademark), MOST (Media Oriented Systems Transport) (registered trademark), Ethernet (registered trademark), LIN (Local Interconnect Network), or the like.

In this example, each in-vehicle communication device 111 is connected to the gateway device 101 via a corresponding bus 14 according to the Ethernet standard. Each control device 122 in each bus connection device group 121 is connected to the gateway device 101 via a corresponding bus 13 according to the CAN standard.

The buses 13 are provided for the respective types of systems, for example. Specifically, the buses 13 are implemented as a drive-related bus, a chassis/safety-related bus, a body/electrical-equipment-related bus, and an AV/information-related bus, for example.

The drive-related bus has, connected thereto, an engine control device, an AT (Automatic Transmission) control device, and an HEV (Hybrid Electric Vehicle) control device, which are examples of the control device 122. The engine control device, the AT control device, and the HEV control device control an engine, AT, and switching between the engine and a motor, respectively.

The chassis/safety-related bus has, connected thereto, a brake control device, a chassis control device, and a steering control device, which are examples of the control device 122. The brake control device, the chassis control device, and the steering control device control a brake, a chassis, and steering, respectively.

The body/electrical-equipment-related bus has, connected thereto, an instrument indication control device, an air conditioner control device, a burglar prevention control device, an air bag control device, and a smart entry control device, which are examples of the control device 122. The instrument indication control device, the air conditioner control device, the burglar prevention control device, the air bag control device, and the smart entry control device control instruments, an air conditioner, a burglar prevention mechanism, an air bag mechanism, and smart entry, respectively.

The AV/information-related bus has, connected thereto, a navigation control device, an audio control device, an ETC (Electronic Toll Collection System) (registered trademark) control device, and a telephone control device, which are examples of the control device 122. The navigation control device, the audio control device, the ETC control device, and the telephone control device control a navigation device, an audio device, an ETC device, and a mobile phone, respectively.

The bus 13 need not necessarily have the control devices 122 connected thereto, and may have connected thereto a device other than the control devices 122.

The gateway device 101 is a central gateway (CGW), for example, and can perform communication with the in-vehicle devices.

The gateway device 101 performs a relay process of relaying information transmitted/received between control devices 122 that are connected to different buses 13 in the vehicle 1, information transmitted/received between in-vehicle communication devices 111, and information transmitted/received between a control device 122 and an in-vehicle communication device 111, for example.

More specifically, in the vehicle 1, for example, a message is periodically transmitted from an in-vehicle device to another in-vehicle device in accordance with a predetermined rule. In this example, a message that is periodically transmitted from a control device 122 to another control device 122 is described. However, the same also applies to a message that is transmitted between a control device 122 and an in-vehicle communication device 111, and a message that is transmitted between in-vehicle communication devices 111.

Transmission of a message may be performed by broadcast, unicast, or multicast. Hereinafter, a message that is periodically transmitted is also referred to as a periodic message.

In the vehicle 1, a message that is non-periodically transmitted from a control device 122 to another control device 122 is present, in addition to a periodic message. Each message includes an ID (Identifier) for identifying the content of the message, transmission source, message number, and the like. Whether or not the message is a periodic message can be discerned by the ID included in the message.

[Configuration of Gateway Device]

Figure 3:
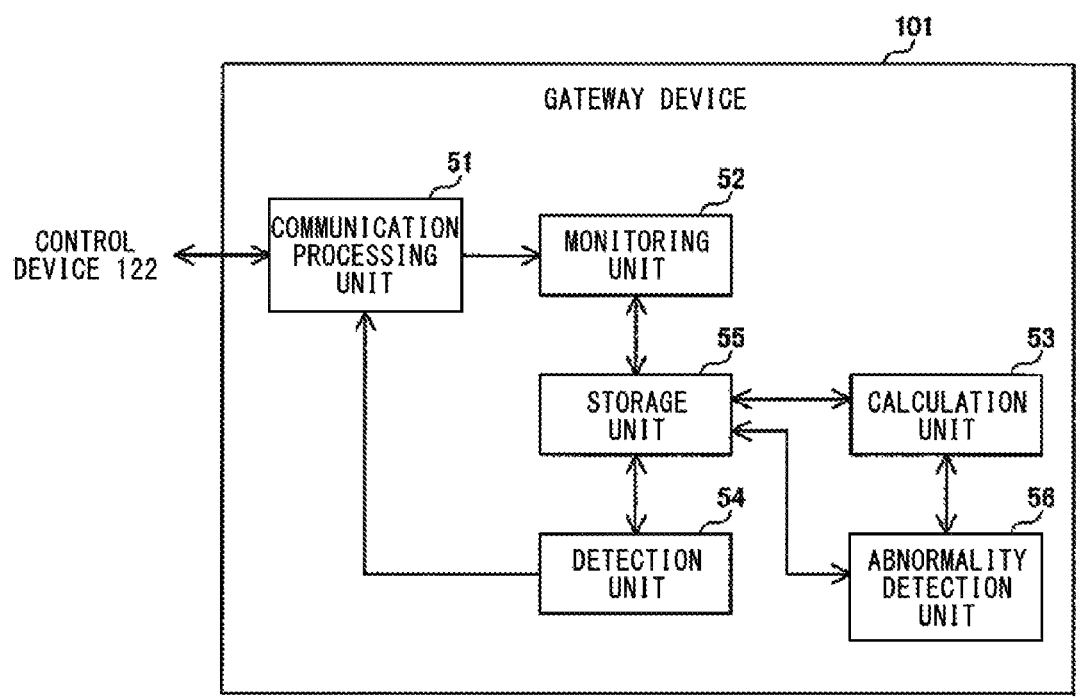
FIG. 3 shows a configuration of a gateway device in the in-vehicle communication system according to the embodiment of the present disclosure.

FIG. 3 shows a configuration of the gateway device in the in-vehicle communication system according to the embodiment of the present disclosure.

With reference to FIG. 3, the gateway device 101 includes a communication processing unit 51, a monitoring unit 52, a calculation unit 53, a detection unit 54, a storage unit 55, and an abnormality detection unit 56. The storage unit 55 is a flash memory, for example. The communication processing unit 51, the monitoring unit 52, the calculation unit 53, the detection unit 54, and the abnormality detection unit 56 are each realized by a processor such as a CPU (Central Processing Unit) or a DSP (Digital Signal Processor).

The gateway device 101 functions as a detection device and performs a detection process of detecting an unauthorized message in the in-vehicle network 12.

[Communication Processing Unit]

The communication processing unit 51 performs a relay process of relaying a message transmitted between control devices 122.

For example, upon receiving a message from a certain control device 122 via a corresponding bus 13, the communication processing unit 51 attaches, to the received message, a time stamp indicating the reception time of the message. Then, the communication processing unit 51 transmits the message having the time stamp attached thereto, to another control device 122 via a corresponding bus 13.

[Monitoring Unit]

The monitoring unit 52 monitors an authorized periodic message and an unauthorized message as messages to be subjected to the detection process by the gateway device 101, i.e., as target messages Ma, and monitors a reference message Mb that is periodically transmitted.

More specifically, the monitoring unit 52 monitors two types of periodic messages M1, M2 in the in-vehicle network 12.

For example, the periodic messages M1, M2 are messages having different IDs. Specifically, at least one of a transmission source address and a transmission destination address of the periodic message M1 is different from that of the periodic message M2. Alternatively, the periodic messages M1, M2 may have different port numbers in IP headers.

Figure 4:
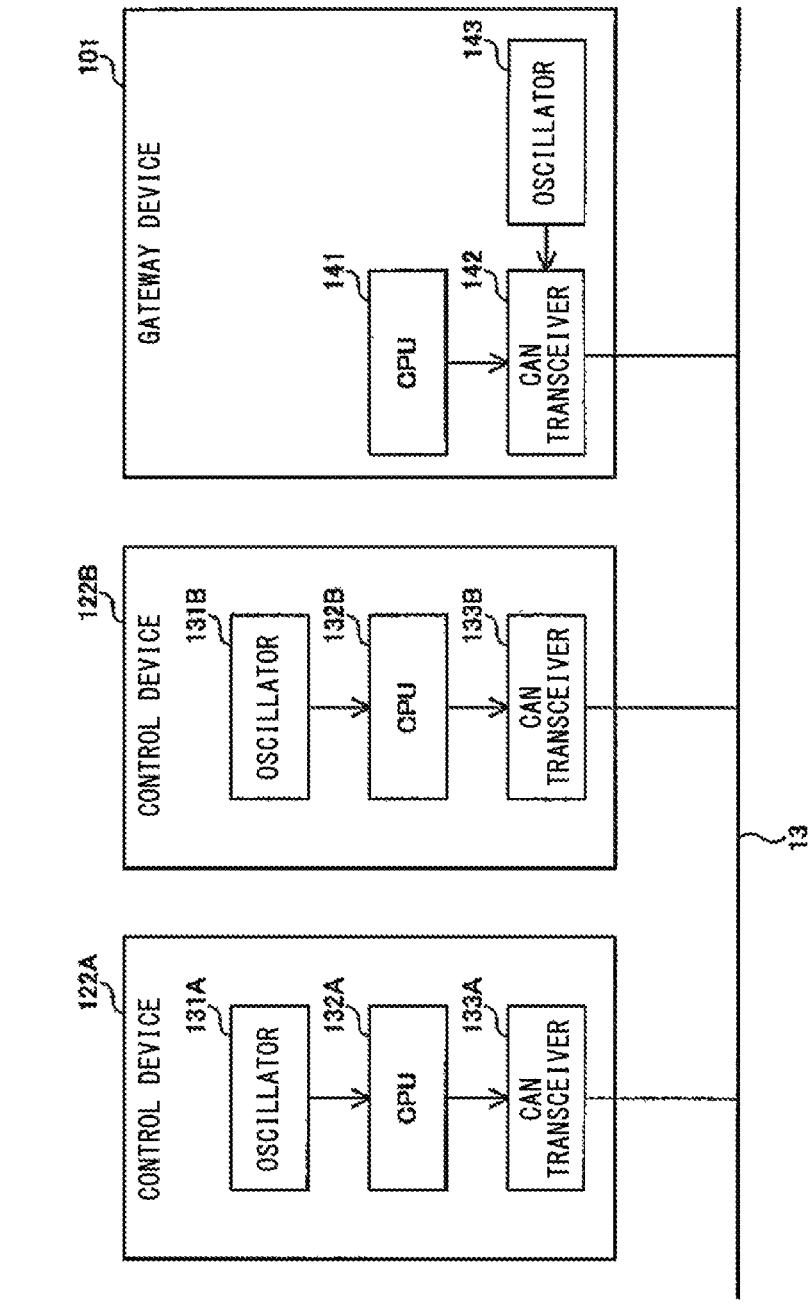
FIG. 4 shows an example of hardware configurations of control devices and a gateway device in the in-vehicle communication system according to the embodiment of the present disclosure.

FIG. 4 shows an example of a hardware configuration of the control device and the gateway device in the in-vehicle communication system according to the embodiment of the present disclosure.

With reference to FIG. 4, a control device 122A as an example of the control device 122 includes an oscillator 131A, a CPU (Central Processing Unit) 132A, and a CAN transceiver 133A. A control device 122B as an example of the control device 122 includes an oscillator 131B, a CPU 132B, and a CAN transceiver 133B.

The gateway device 101 includes a CPU 141, a CAN transceiver 142, and an oscillator 143. The CPU 141 implements a part or the entirety of the monitoring unit 52, the calculation unit 53, and the detection unit 54. The CAN transceiver 142 implements a part or the entirety of the communication processing unit 51.

The control device 122A transmits a periodic message M1 in a transmission cycle Ta. More specifically, the CPU 132A in the control device 122A broadcasts or unicasts the periodic message M1 via the CAN transceiver 133A, according to a timing of a clock generated based on an oscillation signal from the oscillator 131A.

The control device 122B transmits a periodic message M2 in a transmission cycle Tb. More specifically, the CPU 132B in the control device 122B broadcasts or unicasts the periodic message M2 via the CAN transceiver 133B, according to a timing of a clock generated based on an oscillation signal from the oscillator 131B.

The CAN transceiver 142 in the gateway device 101 attaches a time stamp indicating a reception time to the periodic message M1 received from the control device 122A, according to a timing of a clock generated based on an oscillation signal from the oscillator 143. Moreover, the CAN transceiver 142 attaches a time stamp indicating a reception time to the periodic message M2 received from the control device 122B, according to a timing of a clock generated based on an oscillation signal from the oscillator 143.

One of the message received from the control device 122A and the message received from the control device 122B is a target message Ma, and the other message (i.e., one of the periodic messages M1 and M2) is a message to be used for determination in the detection process as to whether or not a message is an unauthorized message, i.e., a reference message Mb. In the following description, as an example, the message received from the control device 122A is the target message Ma, and the message received from the control device 122B is the reference message Mb.

For example, some of messages that the gateway device 101 receives from the control device 122A are unauthorized messages. The monitoring unit 52 monitors, as target messages Ma, an authorized periodic message M1 and an unauthorized message from the control device 122A, and monitors a periodic message M2 from the control device 122B as a reference message Mb.

The monitoring unit 52 monitors messages relayed by the communication processing unit 51 to acquire a reception time to of a target message Ma and a reception time tb of a reference message Mb.

For example, the storage unit 55 stores therein an ID of the target message Ma and an ID of the reference message Mb. Hereinafter, the ID of the target message Ma is also referred to as a target ID, and the ID of the reference message Mb is also referred to as a reference ID.

When the communication processing unit 51 has received a message to be subjected to the relay process, the monitoring unit 52 confirms the ID included in the message received by the communication processing unit 51, and a target ID and a reference ID stored in the storage unit 55.

When the ID included in the message received by the communication processing unit 51 matches the target ID, the monitoring unit 52 recognizes that the message received by the communication processing unit 51 is a target message Ma, and acquires a reception time ta of the target message Ma by referring to a time stamp attached to the target message Ma.

Upon acquiring the reception time ta, the monitoring unit 52 stores, in the storage unit 55, reception information indicating the acquired reception time ta such that the reception information is associated with a reception number N1 indicating the ordinal number of the target message Ma which was received by the communication processing unit 51.

When the ID included in the message received by the communication processing unit 51 matches the reference ID, the monitoring unit 52 recognizes that the message received by the communication processing unit 51 is the reference message Mb, and acquires the reception time tb of the reference message Mb by referring to a time stamp attached to the reference message Mb.

Upon acquiring the reception time tb, the monitoring unit 52 stores, in the storage unit 55, reception information indicating the acquired reception time tb such that the reception information is associated with a reception number N2 indicating the ordinal number of the reference message Mb which was received by the communication processing unit 51.

[Calculation Unit]

The calculation unit 53, based on a monitoring result of the monitoring unit 52, calculates a time difference between a time corresponding to a transmission time of a target message Ma and a time corresponding to a transmission time of a reference message Mb.

More specifically, the calculation unit 53, based on the reception information stored in the storage unit 55, calculates a time difference between the reception time to of the target message Ma and the reception time tb of the reference message Mb.

Calculation Example 1

Figure 5:
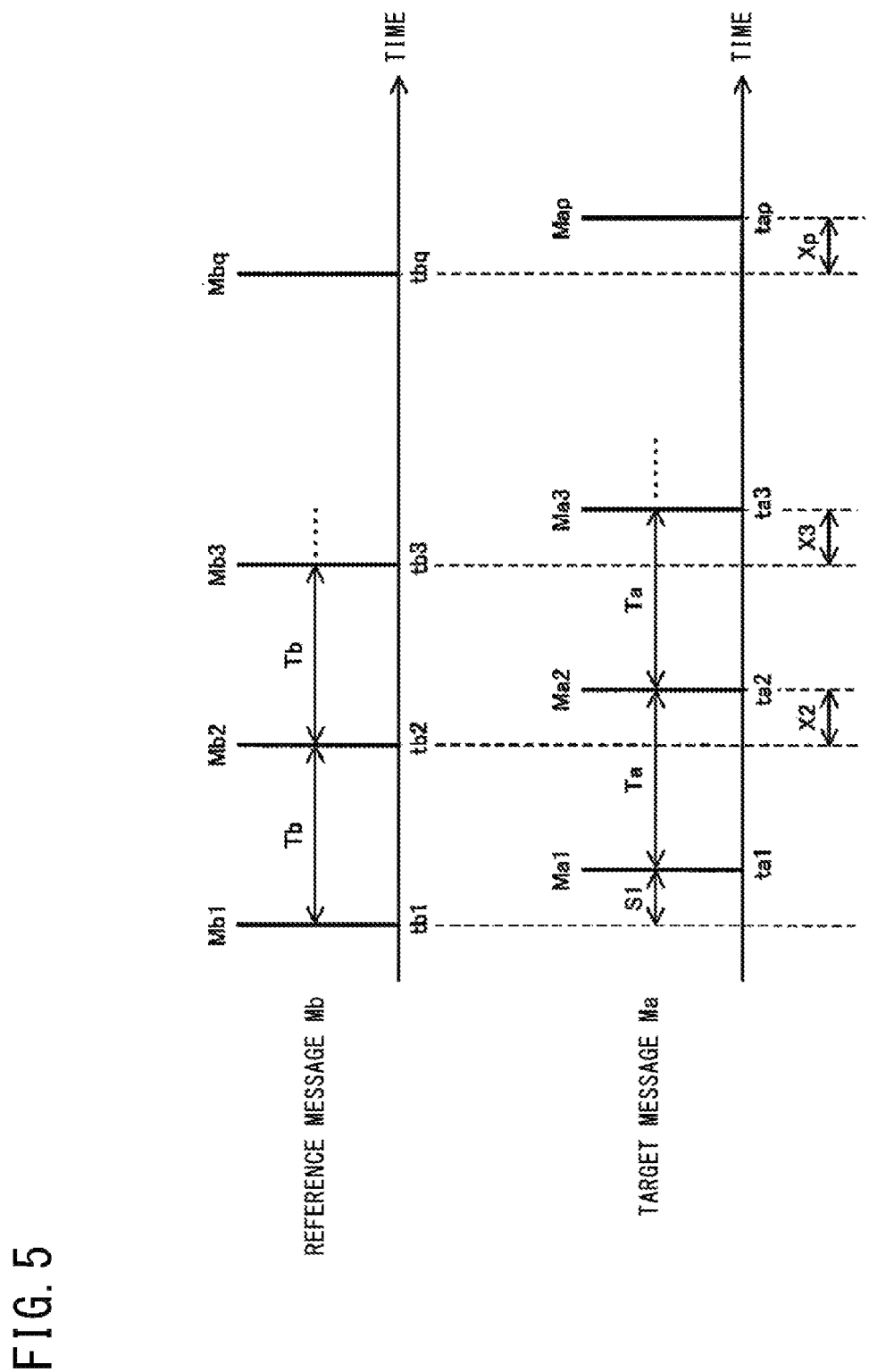
FIG. 5 shows an example of a distribution of reception times of target messages and reference messages in the in-vehicle communication system according to the embodiment of the present disclosure.

FIG. 5 shows an example of a distribution of reception times of target messages and reference messages in the in-vehicle communication system according to the embodiment of the present disclosure. In FIG. 5, the horizontal axis represents time. FIG. 5 shows a case where, when all the target messages Ma are authorized messages, a transmission cycle Ta of the target messages Ma is equal to a transmission cycle Tb of the reference messages Mb.

With reference to FIG. 5, for example, based on the reception information stored in the storage unit 55, the calculation unit 53 calculates a time difference Xp between a reception time tap of a p-th target message Map whose reception number N1 is p and a reception time tbq of a q-th reference message Mbq whose reception number N2 is q. Here, p is an integer not smaller than 1, and q is an integer not smaller than 1. For example, q is equal to p.

The reception time tap of the p-th target message Map is expressed by formula (1) below.

[Math. 1]

$$tap = p(Ta+E1+E3) + \Sigma_{i=1}^{p} A_i \qquad (1)$$

The reception time tbq of the q-th reference message Mbq is expressed by formula (2) below.

[Math. 2]

$$tbq = q(Tb+E2+E3) + \Sigma_{i=1}^{q} B_i - S1 \qquad (2)$$

In the above formulae, E1 is an error, in a message transmission time, based on a jitter caused by the oscillator 131A in the control device 122A; E2 is an error, in a message transmission time, based on a jitter caused by the oscillator 131B in the control device 122B; and E3 is an error, in a message reception time, based on a jitter caused by the oscillator 143 in the gateway device 101. The errors E1, E2, E3 are caused by manufacturing processes, usage environments, aged deteriorations, etc., of the oscillators 131A, 131B, 143, respectively.

In addition, Ai is a delay time caused by a collision or a transmission wait delay, in the bus 13, of an i-th message from the control device 122A. Bi is a delay time caused by a collision or a transmission wait delay, in the bus 13, of an i-th message from the control device 122A. S1 is a phase difference, i.e., an offset, between the transmission cycle Ta of the target message Ma and the transmission cycle Tb of the reference message Mb.

The time difference Xp is expressed by formula (3) below by subtracting formula (2) from formula (1). In formula (3), q=p.

[Math. 3]

$$Xp = p(E1-E2) + p(Ta-Tb) + (\Sigma_{i=1}^{p}(A_i - B_i)) + S1 \qquad (3)$$

As described above, the transmission cycle Ta and the transmission cycle Tb are equal to each other. In addition, each of the delay times Ai, Bi independently repeats an increase and decrease according to the communication state. Therefore, the sigma term in formula (3) can be replaced with an error Error1 that does not monotonically increase but repeats an increase and decrease within a certain numerical range. Moreover, assuming that the error E1 based on an error in an oscillation signal from the oscillator 131A is equal to the error E2 based on an error in an oscillation signal from the oscillator 131B, the time difference Xp can be expressed by formula (4) below.

[Math. 4]

$$Xp \approx S1 + Error1 \qquad (4)$$

Therefore, the time difference Xp is a value that does not depend on the reception numbers N1, N2, and a probability distribution of the time difference Xp is a normal distribution, for example.

When the reception information has been stored in the storage unit 55 by the monitoring unit 52, the calculation unit 53 calculates the time difference Xp between the reception time tap and the reception time tbp, based on the reception information stored in the storage unit 55, and stores, in the storage unit 55, time difference information indicating the calculated time difference Xp.

Calculation Example 2

Figure 6:
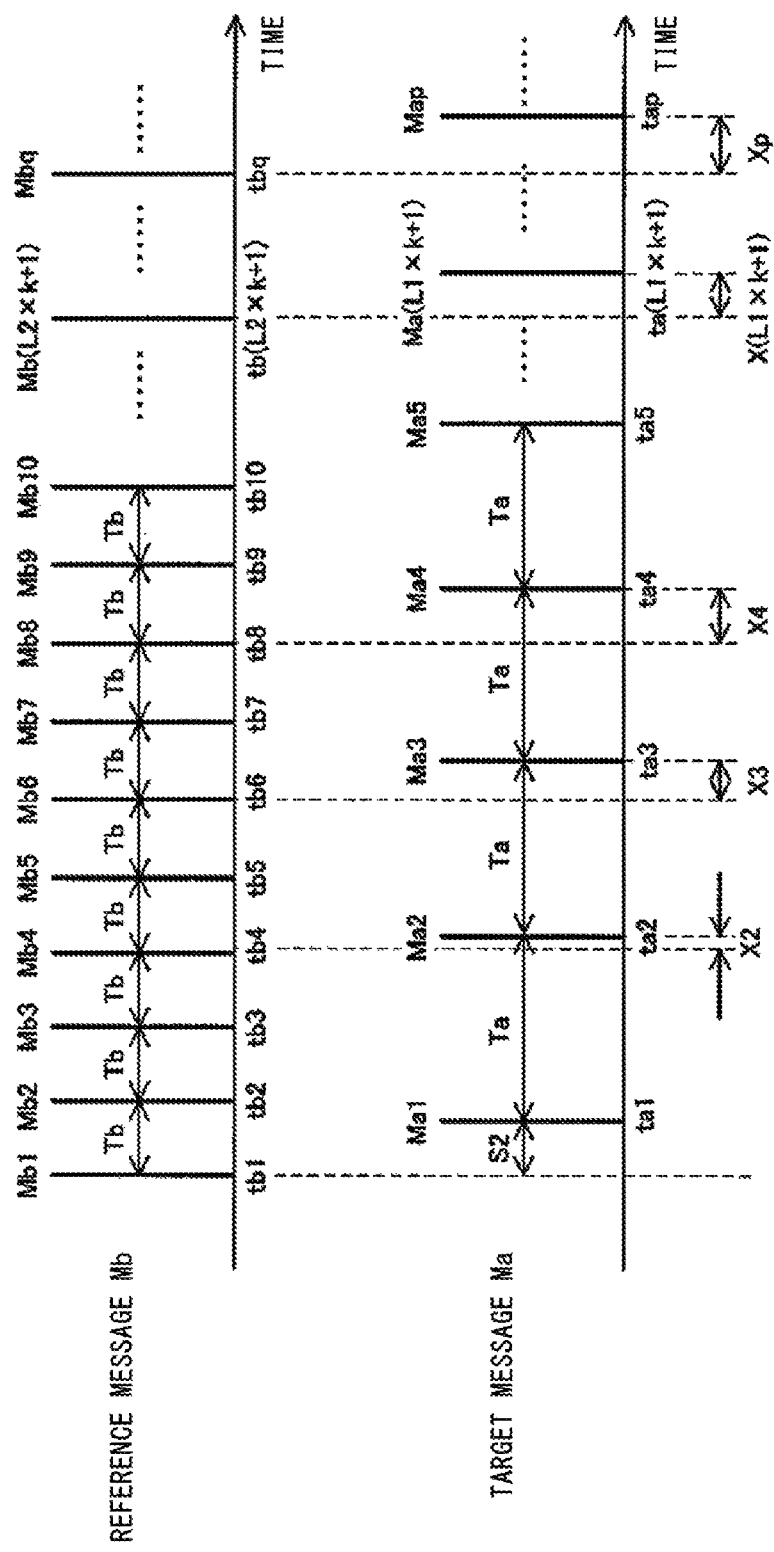
FIG. 6 shows another example of a distribution of reception times of target messages and reference messages in the in-vehicle communication system according to the embodiment of the present disclosure.

FIG. 6 shows another example of a distribution of reception times of target messages and reference messages in the in-vehicle communication system according to the embodiment of the present disclosure. In FIG. 6, the horizontal axis represents time. FIG. 6 shows a case where, when all the target messages Ma are authorized messages, the transmission cycle Tb of the reference messages Mb is shorter than the transmission cycle Ta of the target messages Ma. Specifically, FIG. 6 shows a case where the transmission cycle Tb is 3 seconds and the transmission cycle Ta is 7 seconds.

With reference to FIG. 6, for example, based on the reception information stored in the storage unit 55, the calculation unit 53 calculates a time difference Xp between a reception time tap of a p-th target message Map and a reception time tbq of a q-th reference message Mbq that has been received immediately before the reception time tap.

In theory, a time difference between a transmission time of a target message Map and a transmission time of a reference message Mbq varies in a cycle of a least common multiple L between the transmission cycle Ta and the transmission cycle Tb. Since the transmission cycle Tb is 3 seconds and the transmission cycle Ta is 7 seconds in the example shown in FIG. 6, the least common multiple L is 21 seconds.

Assuming that a value obtained by dividing L by Ta is L1, a reception time ta(L1×k+1) of a (L1×k+1)-th target message Ma(L1×k+1) is expressed by formula (5) below.

[Math. 5]

$$ta(L1×k+1)=k(L+E4+E6)+\Sigma_{i=1}^{k}C_i \quad (5)$$

Assuming that a value obtained by dividing L by Tb is L2, a reception time tb(L2×k+1) of a (L2×k+1)-th reference message Mb(L2×k+1) is expressed by formula (6) below.

[Math. 6]

$$ta(L2×k+1)=k(L+E5+E6)+\Sigma_{i=1}^{k}D_i-S2 \quad (6)$$

In the above formulae, E4 is an error, in a message transmission time, based on a jitter caused by the oscillator 131A in the control device 122A; E5 is an error, in a message transmission time, based on a jitter caused by the oscillator 131B in the control device 122B; and E6 is an error, in a message reception time, based on a jitter caused by the oscillator 143 in the gateway device 101. The errors E4, E5, E6 are caused by manufacturing processes, usage environments, aged deteriorations, etc., of the oscillators 131A, 131B, 143, respectively.

In addition, Ci is a delay time caused by a collision and a transmission wait delay, in the bus 13, of an i-th message from the control device 122A. Di is a delay time caused by a collision and a transmission wait delay, in the bus 13, of an i-th message from the control device 122A. S2 is a phase difference, i.e., an offset, between the transmission cycle Ta of the target message Ma and the transmission cycle Tb of the reference message Mb.

The time difference X(L1×k+1) is expressed by formula (7) below by subtracting formula (6) from formula (5).

[Math. 7]

$$X(L1×k+1)=k(E4-E5)+(\Sigma_{i=1}^{k}(C_i-D_i))+S2 \quad (7)$$

Each of the delay times Ci, Di independently repeats an increase and decrease according to the communication state. Therefore, the sigma term in formula (7) can be replaced with an error Error2 that does not monotonically increase but repeats an increase and decrease within a certain numerical range. Moreover, assuming that the error E4 based on an error in an oscillation signal from the oscillator 131A is equal to the error E5 based on an error in an oscillation signal from the oscillator 131B, the time difference X(L1×k+1) can be expressed by formula (8) below.

[Math. 8]

$$X(L1×k+1)=S2+Error2 \quad (8)$$

Therefore, the time difference X(L1×k+1) is a value that does not depend on the reception numbers N1, N2, and a probability distribution of the time difference X(L1×k+1) is a normal distribution, for example.

When the reception information has been stored in the storage unit 55 by the monitoring unit 52, the calculation unit 53 calculates the time difference Xp between the reception time tap and the reception time tbq, based on the reception information stored in the storage unit 55, and stores, in the storage unit 55, time difference information indicating the calculated time difference Xp.

Calculation Example 3

Figure 7:
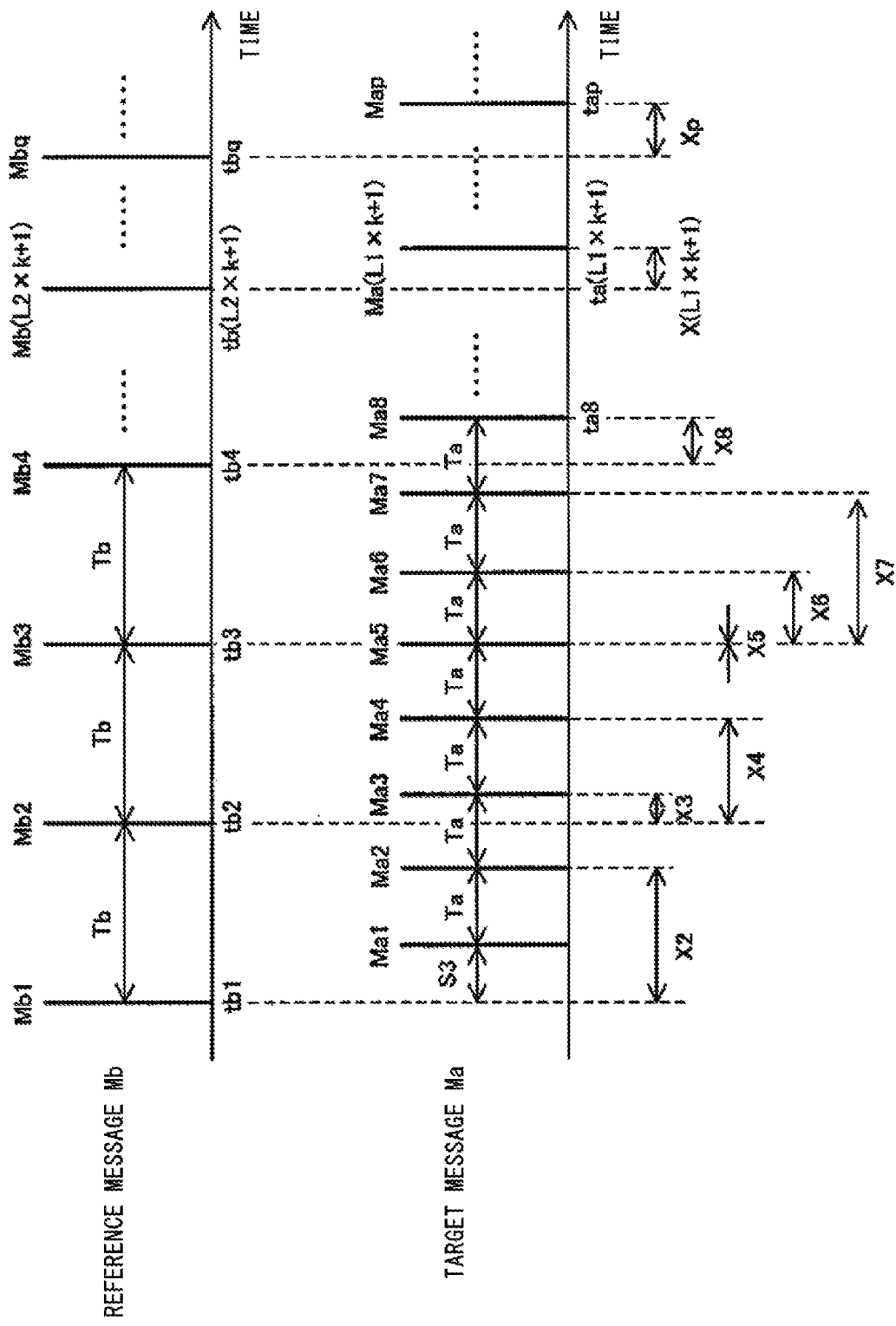
FIG. 7 shows another example of a distribution of reception times of target messages and reference messages in the in-vehicle communication system according to the embodiment of the present disclosure.

FIG. 7 shows another example of a distribution of reception times of target messages and reference messages in the in-vehicle communication system according to the embodiment of the present disclosure. In FIG. 7, the horizontal axis represents time. FIG. 7 shows a case where, when all the target messages Ma are authorized messages, the transmission cycle Ta of the target messages Ma is shorter than the transmission cycle Tb of the reference messages Mb. Specifically, FIG. 7 shows a case where the transmission cycle Ta is 3 seconds and the transmission cycle Tb is 7 seconds.

With reference to FIG. 7, for example, based on the reception information stored in the storage unit 55, the calculation unit 53 calculates a time difference Xp between a reception time tap of a p-th target message Map and a reception time tbq of a q-th reference message Mbq that has been received immediately before the reception time tap. Here, p is an integer not smaller than 1, and q is an integer not smaller than 1.

In theory, a time difference between a transmission time of a target message Map and a transmission time of a reference message Mbq varies in a cycle of a least common multiple L between the transmission cycle Ta and the transmission cycle Tb. Since the transmission cycle Tb is 7 seconds and the transmission cycle Ta is 3 seconds in the example shown in FIG. 7, the least common multiple L is 21.

Assuming that a value obtained by dividing L by Ta is L1, a reception time ta(L1×k+1) of a (L1×k+1)-th target message Ma(L1×k+1) is expressed by formula (9) below.

[Math. 9]

$$ta(L1×k+1)=k(L+E7+E9)+\Sigma_{i=1}^{k}E_i \quad (9)$$

Assuming that a value obtained by dividing L by Tb is L2, a reception time tb(L2×k+1) of a (L2×k+1)-th reference message Mb(L2×k+1) is expressed by formula (10) below.

[Math. 10]

$$ta(L2×k+1)=k(L+E8+E9)+\Sigma_{i=1}^{k}F_i-S3 \quad (10)$$

In the above formulae, E7 is an error, in a message transmission time, based on a jitter caused by the oscillator 131A in the control device 122A; E8 is an error, in a message transmission time, based on a jitter caused by the oscillator 131B in the control device 122B; and E9 is an error, in a message reception time, based on a jitter caused by the oscillator 143 in the gateway device 101. The errors E7, E8, E9 are caused by manufacturing processes, usage environments, aged deteriorations, etc., of the oscillators 131A, 131B, 143, respectively.

In addition, Ei is a delay time caused by a collision and a transmission wait delay, in the bus 13, of an i-th message from the control device 122A. Fi is a delay time caused by a collision and a transmission wait delay, in the bus 13, of an i-th message from the control device 122A. S2 is a phase difference, i.e., an offset, between the transmission cycle Ta of the target message Ma and the transmission cycle Tb of the reference message Mb.

The time difference $X(L1 \times k+1)$ is expressed by formula (11) below by subtracting formula (10) from formula (9).

[Math. 11]

$$X(L1 \times k+1) = k(E7-E8) + (\Sigma_{i=1}^{k}(E_i - F_i)) + S3 \qquad (11)$$

Each of the delay times Ei, Fi independently repeats an increase and decrease according to the transmission state. Therefore, the sigma term in formula (11) can be replaced with an error Error3 that does not monotonically increase but repeats an increase and decrease within a certain numerical range. Moreover, assuming that the error E7 based on an error in an oscillation signal from the oscillator 131A is equal to the error E8 based on an error in an oscillation signal from the oscillator 131B, the time difference $X(L1 \times k+1)$ can be expressed by formula (12) below.

[Math. 12]

$$X(L1 \times k+1) = S3 + Error3 \qquad (12)$$

Therefore, the time difference $X(L1 \times k+1)$ is a value that does not depend on the reception numbers N1, N2, and a probability distribution of the time difference $X(L1 \times k+1)$ is a normal distribution, for example.

When the reception information has been stored in the storage unit 55 by the monitoring unit 52, the calculation unit 53 calculates the time difference Xp between the reception time tap and the reception time tbq, based on the reception information stored in the storage unit 55, and stores, in the storage unit 55, time difference information indicating the calculated time difference Xp.

Calculation Example 4

Figure 8:
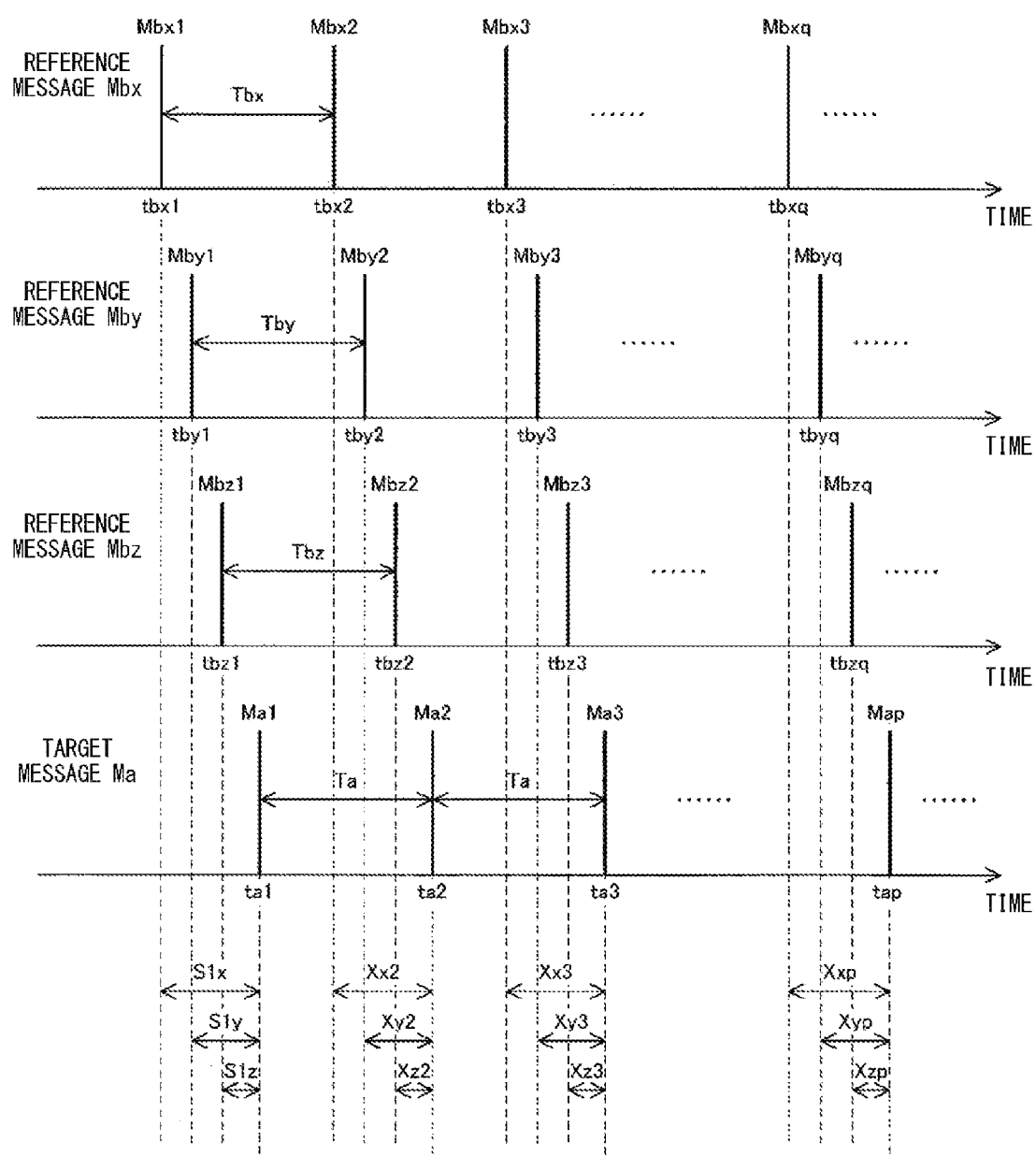
FIG. 8 shows another example of a distribution of reception times of target messages and reference messages in the in-vehicle communication system according to the embodiment of the present disclosure.

FIG. 8 shows an example of a distribution of reception times of target messages and reference messages in the in-vehicle communication system according to the embodiment of the present disclosure. In FIG. 8, the horizontal axis represents time. FIG. 8 shows a case where, when all the target messages Ma are authorized messages, the transmission cycle Ta of the target messages Ma is equal to a transmission cycle Tbx of reference messages Mbx, a transmission cycle Tby of reference messages Mby, and a transmission cycle Tbz of reference messages Mbz.

With reference to FIG. 8, for example, based on the reception information stored in the storage unit 55, the calculation unit 53 calculates a time difference Xxq between a reception time tap of a p-th target message Map and a reception time tbxq of a q-th reference message Mbxq. Furthermore, based on the reception information stored in the storage unit 55, the calculation unit 53 calculates a time difference Xyq between a reception time taq of a q-th target message Maq and a reception time tbyq of a q-th reference message Mbyq. Moreover, based on the reception information stored in the storage unit 55, the calculation unit 53 calculates a time difference Xzq between the reception time taq of the q-th target message Maq and a reception time tbzq of a q-th reference message Mbzq.

When the reception information has been stored in the storage unit 55 by the monitoring unit 52, the calculation unit 53 calculates, as the time difference Xp, time differences Xxp, Xyp, Xzp, based on the reception information stored in the storage unit 55, and stores, in the storage unit 55, time difference information indicating the calculated time differences Xxp, Xyp, Xzp.

[Detection Unit]

The detection unit 54 performs a detection process of detecting an unauthorized message, based on a time difference Xp calculated by the calculation unit 53.

More specifically, as the detection process, the detection unit 54 determines whether or not a target message Ma is an unauthorized message, according to a criterion.

For example, the criterion is set based on a jitter that is caused by the oscillator 131B in the control device 122B transmitting the reference messages Mb, and on a jitter that is caused by the oscillator 143 in the gateway device 101. Specifically, for example, the criterion is set based on an error, in a message transmission time, based on the jitter caused by the oscillator 131B, and on an error, in a message reception time, based on the jitter caused by the oscillator 143.

For example, when time difference information has been stored in the storage unit 55 by the calculation unit 53, the detection unit 54 calculates a statistical distance of a time difference Xp indicated by the time difference information, and compares the calculated statistical distance with a threshold value Th. Then, based on a result of comparison between the statistical distance and the threshold value Th, the detection unit 54 determines whether or not the target message Ma is an unauthorized message.

For example, the detection unit 54 calculates a Mahalanobis distance $D^2$ as an example of the statistical distance, according to formula (13) below. Note that "$D^2$" means the second power of D.

[Math. 13]

$$D^2 = (Xp-\mu)^T + \Sigma^{-1}(Xp-\mu) \qquad (13)$$

When the calculated Mahalanobis distance $D^2$ is equal to or smaller than the threshold value Th, the detection unit 54 determines that the target message Ma is an authorized message. When the calculated Mahalanobis distance $D^2$ is greater than the threshold value Th, the detection unit 54 determines that the target message Ma is an unauthorized message.

The threshold value Th used for the comparison with the calculated Mahalanobis distance $D^2$ is preferably an appropriate value so as to accurately determine whether or not any unauthorized message is present among the target messages Ma.

For example, the manufacturer of the vehicle 1 calculates, in advance, a Mahalanobis distance $D^2$ on the basis of a time difference Xp that is calculated by the calculation unit 53 when all the target messages Ma are authorized messages, by using a gateway device 101 of a test vehicle of the same type as the vehicle 1.

Figure 9:
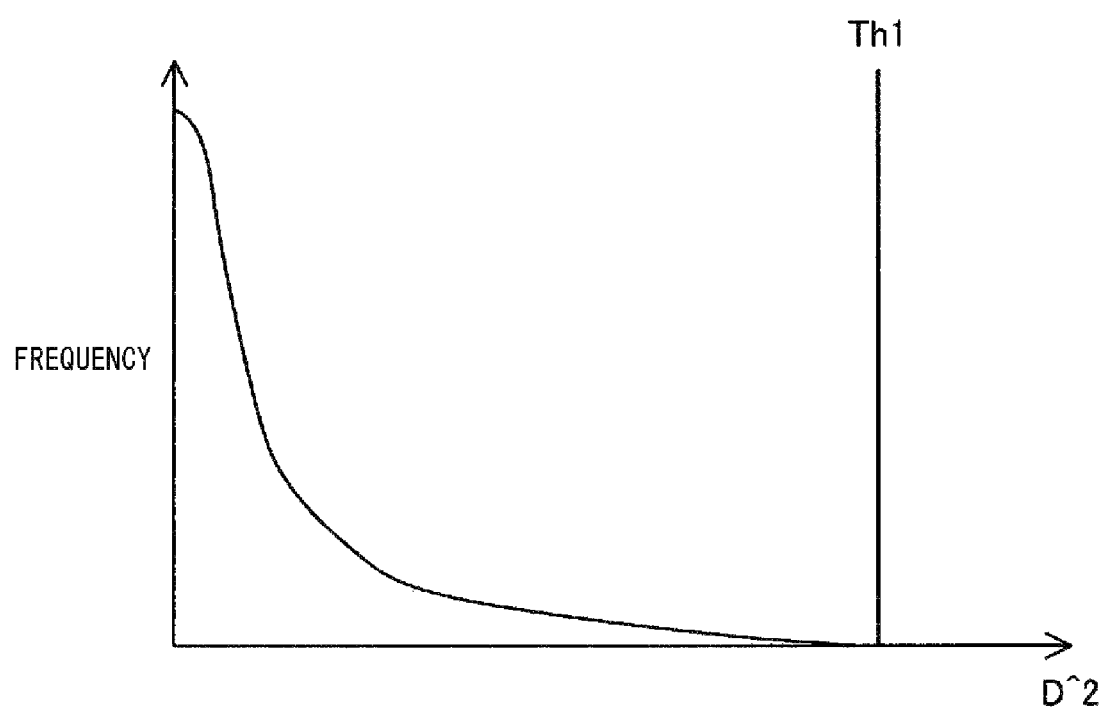
FIG. 9 shows an example of a frequency distribution of a Mahalanobis distance that is calculated when all the target messages are authorized messages, in the in-vehicle communication system according to the embodiment of the present disclosure.

FIG. 9 shows an example of a frequency distribution of the Mahalanobis distance calculated when all the target messages are authorized messages in the in-vehicle communication system according to the embodiment of the present disclosure.

With reference to FIG. 9, the frequency decreases with an increase in the Mahalanobis distance $D^2$, which is calculated by using the time difference Xp when all the target messages Ma are authorized messages.

For example, preferably, the detection unit 54, at startup, acquires the frequency distribution of the Mahalanobis distance $D^2$ shown in FIG. 9 from the storage unit 55, and sets a threshold value Th1 such that the threshold value Th1 becomes smallest in a range where an FPR (False Positive Rate) becomes zero. Here, the FPR refers to a false positive rate and is represented as false positive/(false positive+true negative). The true negative is the frequency at which an authorized message is recognized as an authorized message, and the false positive is the frequency at which an authorized message is detected as an unauthorized message. The storage unit 55 may be configured to store the threshold value Th1 determined in advance by the manufacturer of the vehicle 1. In this case, the detection unit 54, at startup, acquires the threshold value Th1 from the storage unit 55.

The detection unit 54 outputs determination information indicating a determination result based on the Mahalanobis distance D^2 and the threshold value Th to the communication processing unit 51.

When the determination information received from the detection unit 54 indicates that the target message Ma is an authorized message, the communication processing unit 51 transmits the target message Ma to the control device 122 of the transmission destination.

Meanwhile, when the determination information received from the detection unit 54 indicates that the target message Ma is an unauthorized message, the communication processing unit 51 performs the following process.

That is, the communication processing unit 51 records the target message Ma indicated by the determination information. Moreover, the communication processing unit 51 transmits, to a higher-order device inside or outside the vehicle 1, alarm information indicating that an unauthorized message is being transmitted in a bus 13.

[Abnormality Detection Unit]

The abnormality detection unit 56 detects an abnormality of a reference message Mb on the basis of a monitoring result of the monitoring unit 52, and performs a predetermined process upon detecting an abnormality.

More specifically, the abnormality detection unit 56 detects an abnormality of a reference message Mb, based on the reception information stored in the storage unit 55 and on the transmission cycle Tb of the reference message Mb.

For example, the storage unit 55 stores therein a predetermined threshold value ThB that is a criterion to be used when detecting an abnormality of a reference message Mb.

Figure 10:
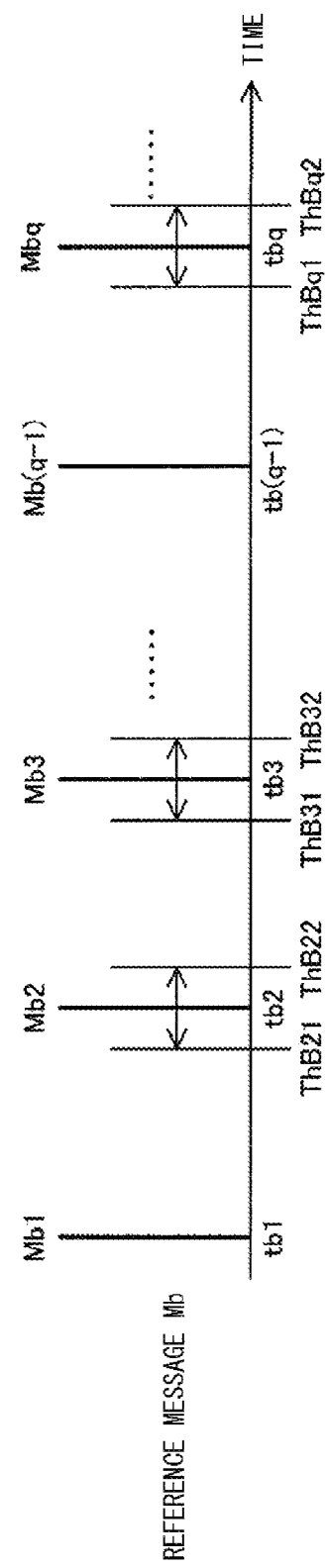
FIG. 10 shows an example of a distribution of reception times of reference messages in the in-vehicle communication system according to the embodiment of the present disclosure.

FIG. 10 shows an example of a distribution of reception times of reference messages in the in-vehicle communication system according to the embodiment of the present disclosure. In FIG. 10, the horizontal axis represents time.

With reference to FIG. 10, based on a reception time tb(q−1) of a reference message Mb(q−1) and the threshold value ThB, the abnormality detection unit 56 sets threshold values ThBq1, ThBq2, for detecting an abnormality of a next reference message Mbq, which define an allowable range of a reception time tbq of a reference message Mbq.

Then, when the reception time tbq of the next reference message Mbq has been stored in the storage unit 55, the abnormality detection unit 56 compares the reception time tbq in the storage unit 55 with the threshold values ThBq1, ThBq2.

When the reception time tbq is not smaller than the threshold value ThBq1 and not greater than the threshold value ThBq2, that is, when the reception time tbq is within the allowable range defined by the threshold values ThBq1, ThBq2, the abnormality detection unit 56 determines that the reference message Mbq is normal.

Meanwhile, when the reception time tbq is smaller than the threshold value ThBq1 or greater than the threshold value ThBq2, that is, when the reception time tbq is outside the allowable range defined by the threshold values ThBq1, ThBq2, the abnormality detection unit 56 determines that the reference message Mbq is abnormal. Upon determining that the reference message Mbq is abnormal, the abnormality detection unit 56 notifies the calculation unit 53 of abnormality determination information indicating the reference message Mbq determined to be abnormal.

For example, upon receiving the abnormality determination information from the abnormality detection unit 56, the calculation unit 53 calculates time differences Xp by using reception times tb of reference messages Mb other than the reference message Mb indicated by the abnormality determination information. Alternatively, upon receiving the abnormality determination information from the abnormality detection unit 56, the calculation unit 53 stops calculation of time differences Xp.

Referring back to FIG. 8, when reception times tb of a plurality of types of reference messages Mb are stored as reception information in the storage unit 55, the abnormality detection unit 56 detects an abnormality of each type of reference message Mb.

For example, the abnormality detection unit 56 detects an abnormality regarding the reference message Mbq, based on the reception time tbq of the reference message Mbq and on a reception time tb(q+1) of a next reference message Mb(q+1) transmitted after the reference message Mbq.

Figure 11:
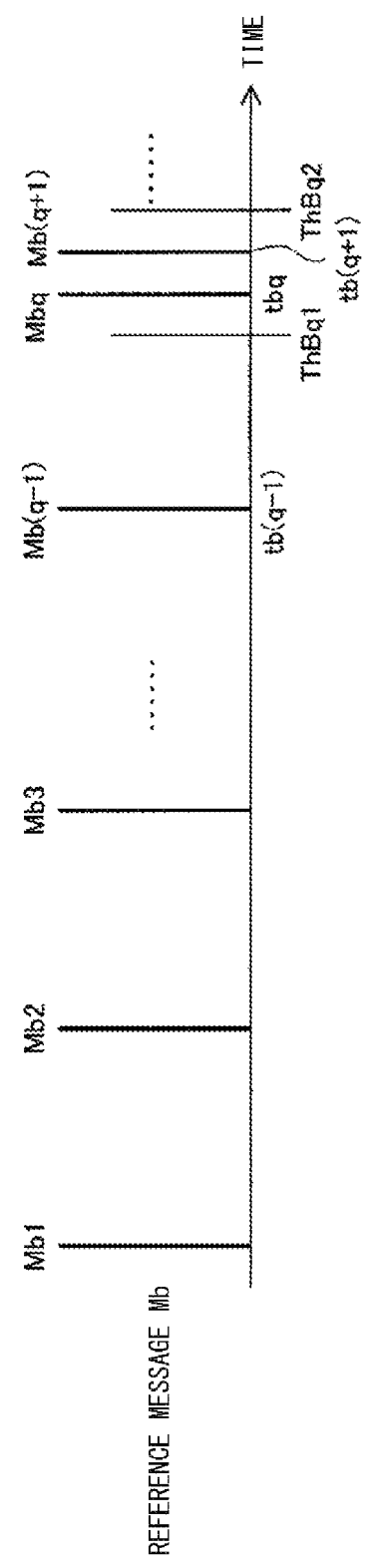
FIG. 11 shows another example of a distribution of reception times of reference messages in the in-vehicle communication system according to the embodiment of the present disclosure.

FIG. 11 shows another example of a distribution of reception times of reference messages in the in-vehicle communication system according to the embodiment of the present disclosure. In FIG. 11, the horizontal axis represents time.

With reference to FIG. 11, after a reference message Mbq, the reception time tbq of which is within the allowable range defined by the threshold values ThBq1, ThBq2, has been determined to be normal, and then if a reception time tb(q+1) of a next reference message Mb(q+1) transmitted after the reference message Mbq is within the allowable range defined by the threshold values ThBq1, ThBq2, the abnormality detection unit 56 determines that there is a possibility that the reference messages Mbq, Mb(q+1) are abnormal.

Upon determining that there is a possibility that the reference messages Mbq, Mb(q+1) are abnormal, the abnormality detection unit 56 notifies the calculation unit 53 of abnormality determination information indicating the reference messages Mbq, Mb(q+1) that may be abnormal.

Upon receiving the abnormality determination information from the abnormality detection unit 56, the calculation unit 53 calculates time differences Xp by using reception times tb of reference messages Mb other than the reference messages Mb that may be abnormal.

(Threshold Value Switching Process)

As described above, in the case where all the target messages Ma are authorized messages, a transmission cycle Ta of the target messages Ma and a transmission cycle Tb of the reference messages Mb may be different from each other in some cases. The detection unit 54 performs the detection process while switching a plurality of criteria.

Referring back to the FIG. 6, for example, when the transmission cycle Tb of the reference messages Mb is shorter than the transmission cycle Ta of the target messages Ma, the time difference Xp calculated by the calculation unit 53 periodically changes.

The detection unit 54 performs the detection process while switching a plurality of criteria according to the periodic change in the time difference Xp.

The number of criteria to be used in the detection process by the detection unit 54 is determined based on the least common multiple L between the transmission cycle Ta of the target messages Ma and the transmission cycle Tb of the reference messages Mb and on the transmission cycle Ta of the target messages Ma in the case where all the target messages Ma are authorized messages. More specifically, the storage unit 55 stores therein criteria, e.g., threshold values Th, the number of which has been determined by the manufacturer of the vehicle 1 in advance.

For example, the storage unit 55 stores therein the transmission cycle Ta of the target messages Ma, the transmission cycle Tb of the reference messages Mb, and offsets S1, S2, S3 in the case where all the target messages Ma are authorized messages. Moreover, the storage unit 55 stores, as criteria to be used by the detection unit 54 in the detection process, threshold values Th the number of which is equal to a value obtained by dividing the least common multiple L by the transmission cycle Ta.

(Specific Example 1 of Threshold Value Switching Process)

FIG. 12 shows an example of a relationship between reception times of target messages and reception times of reference messages in the in-vehicle communication system according to the embodiment of the present disclosure. FIG. 12 corresponds to the distribution of the reception times of the target messages and the reference messages shown in FIG. 6.

With reference to FIG. 12, the time difference Xp between the reception time tap of a target message Map and the reception time tbq of a reference message Mbq to be compared with the target message Map periodically varies, like 2 sec, 0 sec, 1 sec, 2 sec, in theory.

When the transmission cycle Ta of the target messages Ma is 7 seconds and the transmission cycle Tb of the reference messages Mb is 3 seconds as shown in FIG. 6 and FIG. 12, the storage unit 55 stores therein three threshold values Th1, Th2, Th3 according to the value obtained by dividing 21 which is the least common multiple L by 7 which is the transmission cycle Ta.

The detection unit 54 firstly performs a symbol synchronization process for determining a threshold value Th to be used for comparison with the Mahalanobis distance D^2, from among the three threshold values Th1, Th2, Th3.

More specifically, the detection unit 54 calculates time differences Xps as theoretical values in advance, based on the transmission cycles Ta, Tb and the offsets S1, S2, S3 stored in the storage unit 55. For example, the detection unit 54 calculates time differences Xps the number of which is equal to a value obtained by dividing the least common multiple L by the transmission cycle Ta, i.e., three time differences Xps.

When the three time differences Xp have been stored in the storage unit 55 as time difference information, the detection unit 54 performs a pattern matching process of comparing the three time differences Xp stored in the storage unit 55 with the calculated three time differences Xps, respectively.

More specifically, when each of differences between the three time differences Xp and the corresponding three time differences Xps is not greater than the predetermined threshold value, the detection unit 54 ends the symbol synchronization process. Then, the detection unit 54 performs the detection process while switching the threshold values Th1, Th2, Th3 determined in advance so as to correspond to the three time differences Xps, respectively, according to change in the calculated time differences Xps.

On the other hand, when each of the differences between the three time differences Xp and the corresponding three time differences Xps is greater than the predetermined threshold value, the detection unit 54 waits until new time difference information is stored in the storage unit 55. When three new time differences Xp have been stored in the storage unit 55, the detection unit 54 performs the pattern matching process again. The detection unit 54 repeats the pattern matching process until each of the differences between the three time differences Xp and the corresponding three time differences Xps becomes equal to or smaller than the predetermined threshold value.

For example, when reception information of a target message Map has been stored in the storage unit 55, the abnormality detection unit 56 performs abnormality detection for a reference message Mb that has been received between the reception time tap of the target message Map and the reception time ta(p−1) of the immediately preceding target message Ma(p−1).

Specifically, when reception information of a target message Ma the reception time tap of which is 30 seconds has been stored in the storage unit 55, the abnormality detection unit 56 calculates, based on the reception times tbq of three reference messages Mb having been received in a period from 23 seconds, which is the reception time of the immediately preceding target message Ma, to 30 seconds, a time difference Xq of the reception times tbq. Then, the abnormality detection unit 56 performs abnormality detection for the reference message Mb, based on a result of comparison between the calculated time difference Xq and the threshold value ThB in the storage unit 55.

Upon determining that an abnormality occurs in the reference message Mb, the abnormality detection unit 56 notifies the detection unit 54 of abnormality determination information indicating that the abnormality has been detected.

Upon receiving the abnormality determination information from the abnormality detection unit 56, the detection unit 54 performs the symbol synchronization process again.

(Specific Example 2 of Threshold Value Switching Process)

FIG. 13 shows another example of a relationship between reception times of target messages and reception times of reference messages in the in-vehicle communication system according to the embodiment of the present disclosure. FIG. 13 corresponds to the distribution of the reception times of the target messages and the reference messages shown in FIG. 7.

With reference to FIG. 13, the time difference Xp between the reception time tap of a target message Map and the reception time tbq of a reference message Mbq to be compared with the target message Map periodically varies, like 0 sec, 2 sec, 1 sec, 0 sec, in theory.

When the transmission cycle Ta of the target messages Ma is 3 seconds and the transmission cycle Tb of the reference messages Mb is 7 seconds as shown in FIG. 7 and FIG. 13, the storage unit 55 stores therein seven threshold values Th1, Th2, Th3, Th4, Th5, Th6, Th7 according to the value obtained by dividing 21 which is the least common multiple L by 3 which is the transmission cycle Ta.

The detection unit 54 firstly performs a symbol synchronization process for determining a threshold value Th to be used for comparison with the Mahalanobis distance D^2, from among the seven threshold values Th1, Th2, Th3, Th4, Th5, Th6, Th7.

More specifically, the detection unit 54 calculates, in advance, time differences Xps as theoretical values, based on the transmission cycles Ta, Tb and the offsets S1, S2, S3 stored in the storage unit 55. For example, the detection unit 54 calculates time differences Xps the number of which is equal to a value obtained by dividing the least common multiple L by the transmission cycle Ta, i.e., seven time differences Xps.

When the seven time differences Xp have been stored in the storage unit 55 as time difference information, the detection unit 54 compares the seven time differences Xp stored in the storage unit 55 with the calculated seven time differences Xps, respectively.

For example, when each of differences between the seven time differences Xp and the corresponding seven time differences Xps is not greater than the predetermined threshold value, the detection unit 54 ends the symbol synchronization process. Then, the detection unit 54 performs the detection process while switching the threshold value Th1, Th2, Th3, Th4, Th5, Th6, Th7 determined in advance so as to correspond to the seven time differences Xps, respectively, according to change in the calculated time differences Xps.

On the other hand, when each of the differences between the seven time differences Xp and the corresponding seven time differences Xps is greater than the predetermined threshold value, the detection unit 54 waits until new time difference information is stored in the storage unit 55. When seven new time differences Xp have been stored in the storage unit 55, the detection unit 54 performs the pattern matching process again. The detection unit 54 repeats the pattern matching process until each of the differences between the seven time differences Xp and the corresponding seven time differences Xps becomes equal to or smaller than the predetermined threshold value.

(Specific Example 3 of Threshold Value Switching Process)

For example, the detection unit 54 generates a virtual reception time tvb based on a reception time tb of a reference message Mb to compensate for the reference message Mb.

FIG. 14 shows another example of a relationship between reception times of target messages and reception times of reference messages in the in-vehicle communication system according to the embodiment of the present disclosure. FIG. 14 corresponds to the distribution of the reception times of the target messages and the reference messages shown in FIG. 7.

With reference to FIG. 14, after the symbol synchronization process has been executed, when reception information including a reception time tbp of a target message Map is stored in the storage unit 55 by the monitoring unit 52, the detection unit 54 generates f pieces of reception times tvb for a reception time tb of one reference message Mb by using the reception time tb of the latest reference message Mb, according to formulae (14) and (15) below. Here, f is an integer not smaller than 1.

[Math. 14]

$$tvb = tb + Ta \times f + Mg \quad (14)$$

[Math. 15]

$$f = e + 1 \quad (15)$$

In the above formulae, Mg is a predetermined margin that is set in consideration of a delay time of the reference message Mb. For example, the margin Mg is a value obtained by multiplying, by minus 1, a maximum delay time that may occur in the reference message Mb. In addition, e is the number of reception times tvb having already been generated by using the reception time tb of a certain reference message Mb.

When reception information including a reception time ta(p+1) of a next target message Ma(p+1), which is a time after the generated reception time tvb, has been stored in the storage unit 55 by the monitoring unit 52, the detection unit 54 substitutes 1 for e in formula (15) and generates a reception time tvb again, by using the reception time tb of the latest reference message Mb.

The detection unit 54 performs the detection process by using threshold values Th that have been set in advance so as to correspond to time differences Xp between the reception time to of the target message Ma and the generated reception times tvb.

Another Example of Detection Process (Gray Decision)

For example, the detection unit 54 detects an abnormality regarding a target message Map, based on a time difference between a time corresponding to a transmission time of the target message Map and a time corresponding to a transmission time of a reference message Mb, and on a time difference between a time corresponding to a transmission time of a target message Ma(p+1) transmitted after the target message Map and the time corresponding to the transmission time of the reference message Mb. More specifically, the detection unit 54 detects an abnormality regarding a target message Map, based on a time difference Xp between a reception time tap of the target message Map and a reception time tb of a reference message Mb, and on a time difference X(p+1) between a reception time ta(p+1) of a target message Ma(p+1) and the reception time tb of the reference message Mb.

Figure 15:
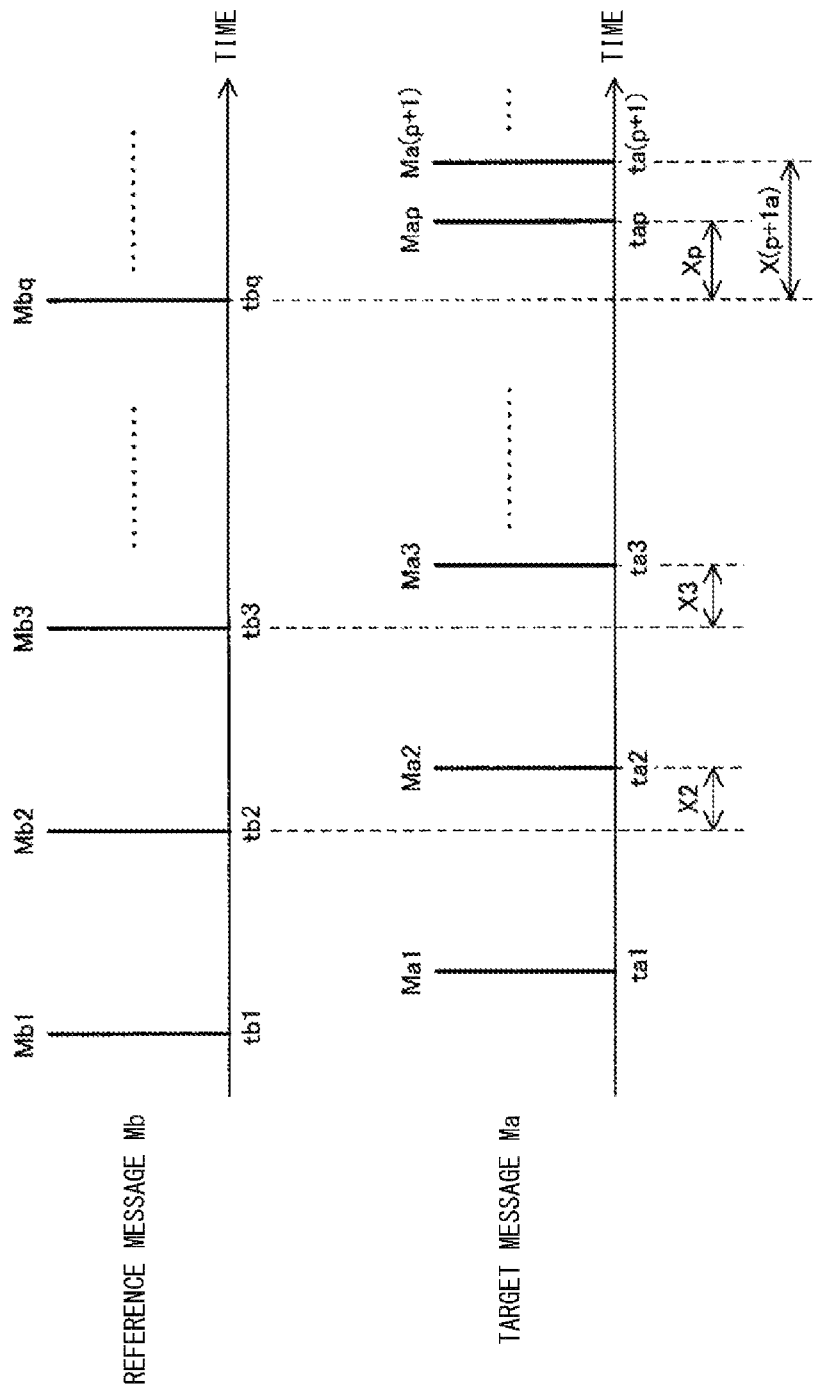
FIG. 15 shows an example of a distribution of reception times of target messages and reference messages in the in-vehicle communication system according to the embodiment of the present disclosure.

FIG. 15 shows an example of a distribution of reception times of target messages and reference messages in the in-vehicle communication system according to the embodiment of the present disclosure. In FIG. 15, the horizontal axis represents time. FIG. 15 shows a case where, when all the target messages Ma are authorized messages, the transmission cycle Ta of the target messages Ma is equal to the transmission cycle Tb of the reference messages Mb.

With reference to FIG. 15, as described above, the calculation unit 53 calculates a time difference Xp between a reception time tap of a target message Map and a reception time tbq of a reference message Mbq.

The detection unit 54 calculates a Mahalanobis distance D^2, based on the time difference Xp and formula (13), compares the calculated Mahalanobis distance D^2 with a threshold value Th, and determines whether or not the target message Map is an unauthorized message, based on a comparison result.

Moreover, the calculation unit 53 calculates a time difference X(p+1a) between a reception time ta(p+1) of a target message Ma(p+1) next to the target message Map and the reception time tbq of the reference message Mbq.

The detection unit 54 calculates a Mahalanobis distance D^2, based on the time difference X(p+1a) and formula (13), compares the calculated Mahalanobis distance D^2 with the threshold value Th, and determines whether or not the target message Ma(p+1) is an unauthorized message, based on a comparison result.

In a case where the detection unit 54 has determined that the target message Map is not an unauthorized message and thereafter has further determined that the target message Ma(p+1) is not an unauthorized message, the detection unit 54 determines that there is a possibility that the target messages Map, Ma(p+1) are abnormal, that is, the detection unit 54 makes gray decision.

(Detection Process Using Support Vector Machine)

In the gateway device 101 according to the embodiment of the present disclosure, the detection unit 54 calculates the Mahalanobis distance D^2 based on the time difference Xp, and determines whether or not the target message Map is an unauthorized message, based on the comparison result between the calculated Mahalanobis distance D^2 and the threshold value Th. However, the present disclosure is not limited thereto.

The detection unit 54 may be configured to determine whether or not a target message Ma is an unauthorized message by using a support vector machine, for example. The detection unit 54 may use a one-class support vector machine or a multiclass support vector machine.

More specifically, the detection unit 54 calculates a classification score f(Xp) according to formula (16) below. When the calculated classification score f(Xp) is zero or more, the detection unit 54 determines that the target message Map is an authorized message. When the calculated classification score f(Xp) is less than zero, the detection unit 54 determines that the target message Map is an unauthorized message.

[Math. 16]

$$f(Xp) = \sum_{i=1}^{m} yi \times Wi \times K(x, xi) + b \qquad (16)$$

In the above formula, K(x, xi) is a kernel function. Specifically, the kernel function is linear kernel, polynomial kernel, Gaussian kernel (in formula (17) below), or sigmoid kernel.

[Math. 17]

$$K(x1, x2) = \exp\left(\frac{\|x1 - x2\|}{\sigma^{\wedge}2}\right) \qquad (17)$$

In addition, x is a vector of time differences Xp between the reception time tap of the target message Map and reception times tbq of a plurality of reference messages Mbq, xi is a support vector, and yi is a value corresponding to each of classes. For example, when using the one-class support vector machine, yi is 1. Wi is a weight vector, and b is a bias. The aforementioned xi, yi, Wi, and b are parameters obtained in advance by using a gateway device 101 of a test vehicle of the same type as the vehicle 1, through machine learning using authorized messages.

When using the one-class support vector machine, the parameters are set by unsupervised learning. More specifically, time differences Xp between the reception time tap of the target message Map which is an authorized message and the reception times tbq of a plurality of reference messages Mbq are calculated, and the calculated time differences Xp are classified into a data set for learning and a data set for verification.

Then, machine learning is performed using the data set for learning, and a classification score f(Xp) of the data set for verification is calculated using parameters obtained through the machine learning and the above formula (16). Then, it is confirmed whether the classification score f(Xp) is not less than zero, or less than zero. That is, it is confirmed whether the data set for verification is determined as an authorized message or an unauthorized message. Then, the parameters are appropriately adjusted such that the FPR of the determination result for the data set for verification has a desired value, and machine learning using the data set for learning is again performed.

When using the multiclass support vector machine, the parameters are set by supervised learning. More specifically, time differences Xp between the reception time tap of the target message Map which is an authorized message and the reception times tbq of a plurality of reference messages Mbq are calculated, and the calculated time differences Xp are set in a normal data group.

Then, an unauthorized data group that is a data group of a plurality time differences Xpr greater than the time differences Xp of the normal data group, and an unauthorized data group that is a data group of a plurality of time differences Xps smaller than the time differences Xp of the normal data group, are generated. The normal data group and the unauthorized data group are classified into a data set for learning and a data set for verification.

Then, machine learning is performed using the data set for learning, and a classification score f(Xp) of the data set for verification is calculated using parameters obtained through the machine learning and the above formula (16). Then, it is confirmed, based on the classification score f(Xp), whether the data set for verification is determined as an authorized message or an unauthorized message. Then, the values of the time differences Xps, Xpr in the unauthorized data groups, i.e., gaps between the unauthorized data groups and the normal data group, and the parameters are appropriately adjusted such that the FPR of the determination result for the data set for verification has a desired value, and machine learning using the data set for learning is again performed.

(Detection Process Using Decision Tree)

The detection unit 54 may be configured to determine whether or not a target message Ma is an unauthorized message, by using a decision tree, for example. The algorithm of the decision tree is, for example, CART (Classification And Regression Trees), C4.5, or the like.

Parameters of the decision tree are set by supervised learning. More specifically, time differences Xp between a reception time tap of a target message Map which is an authorized message and reception times tbq of a plurality of reference messages Mbq are calculated, and the calculated time differences Xp are set in a normal data group.

Then, an unauthorized data group that is a data group of a plurality of time differences Xpr greater than the time differences Xp in the normal data group, and an unauthorized data group that is a data group of a plurality of time differences Xps smaller than the time differences Xp in the normal data group, are generated. The normal data group and the unauthorized data group are classified into a data set for learning and a data set for verification.

Then, machine learning for the decision tree using the algorithm such as CART or C4.5 is performed using the data set for learning, and it is confirmed whether the data set for verification is determined to be an authorized message or determined to be an unauthorized message in the case where the decision tree obtained through the machine learning is used. Then, the values of the time differences Xps, Xpr in the unauthorized data groups, i.e., gaps between the unauthorized data groups and the normal data group, and the learning parameters for the decision tree are appropriately adjusted such that the FPR of the determination result for the data set for verification has a desired value, and machine learning using the data set for learning is again performed.

[Operation Flow]

Each of the devices in the in-vehicle communication system according to the embodiment of the present disclosure is provided with a computer including a memory. An arithmetic processing unit such as a CPU in the computer reads out a program including a part or all of steps in the flowchart and sequence diagram described below from the memory and executes the program. The programs for the plurality of devices can be installed from outside. The programs for the plurality of devices are each distributed in a state of being stored in a storage medium.

Figure 16:
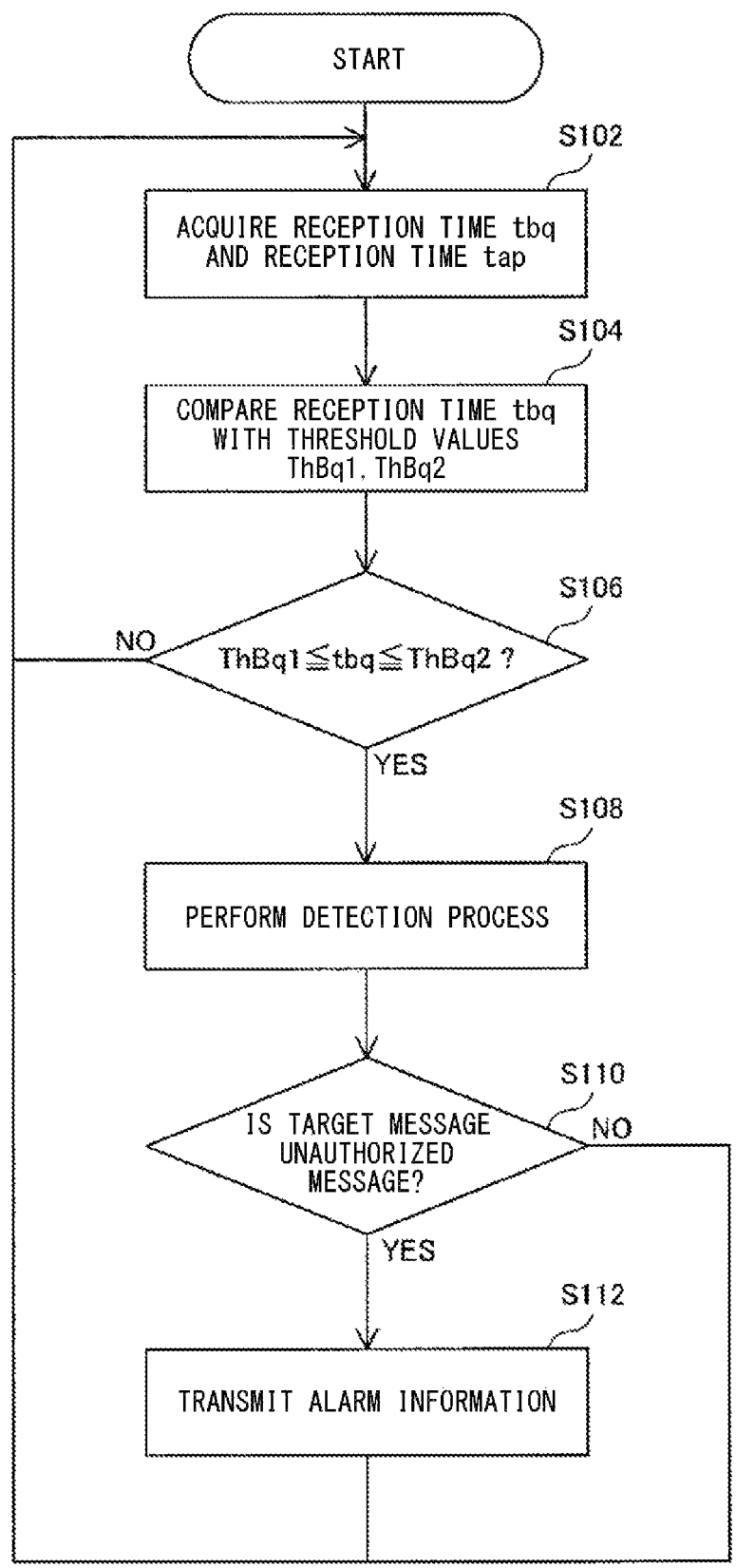
FIG. 16 shows a flowchart of an example of an operation procedure when a gateway device performs a detection process in the in-vehicle communication system according to the embodiment of the present disclosure.

FIG. 16 is a flowchart of an example of an operation procedure when the gateway device performs a detection process in the in-vehicle communication system according to the embodiment of the present disclosure.

With reference to FIG. 16, firstly, the gateway device 101 monitors target messages Ma and reference messages Mb in the in-vehicle network 12, and acquires a reception time tap of a target message Map and a reception time tbq of a reference message Mbq (step S102).

Next, the gateway device 101 compares the reception time tbq of the reference message Mbq with threshold values ThBq1, ThBq2 (step S104).

When the reception time tbq is within an allowable range defined by the threshold values ThBq1, ThBq2 (YES in step S106), the gateway device 101 performs a detection process of detecting an unauthorized message. Specifically, the gateway device 101 determines whether or not the target message Map is an unauthorized message (step S108).

Meanwhile, when the reception time tbq is outside the allowable range defined by the threshold values ThBq1, ThBq2 (NO in step S106), the gateway device 101 continues monitoring target messages Ma and reference messages Mb, and acquires a reception time ta(p+1) of a next target message Ma(p+1) and a reception time tb(q+1) of a next reference message Mb(q+1) (step S102).

When the gateway device 101 has determined that the target message Map is an authorized message, as a result of the detection process (NO in step S110), the gateway device 101 continues monitoring target messages Ma and reference messages Mb, and acquires a reception time ta(p+1) of a next target message Ma(p+1) and a reception time tb(q+1) of a next reference message Mb(q+1) (step S102).

Meanwhile, when the gateway device 101 has determined that the target message Map is an unauthorized message, as a result of the detection process (YES in step S110), the gateway devices transmits, to a higher-order device inside or outside the vehicle 1, alarm information indicating that the unauthorized message is being transmitted (step S112).

The gateway device 101 continues monitoring target messages Ma and reference messages Mb, and acquires a reception time ta(p+1) of a next target message Ma(p+1) and a reception time tb(q+1) of a next reference message Mb(q+1) (step S102).

Figure 17:
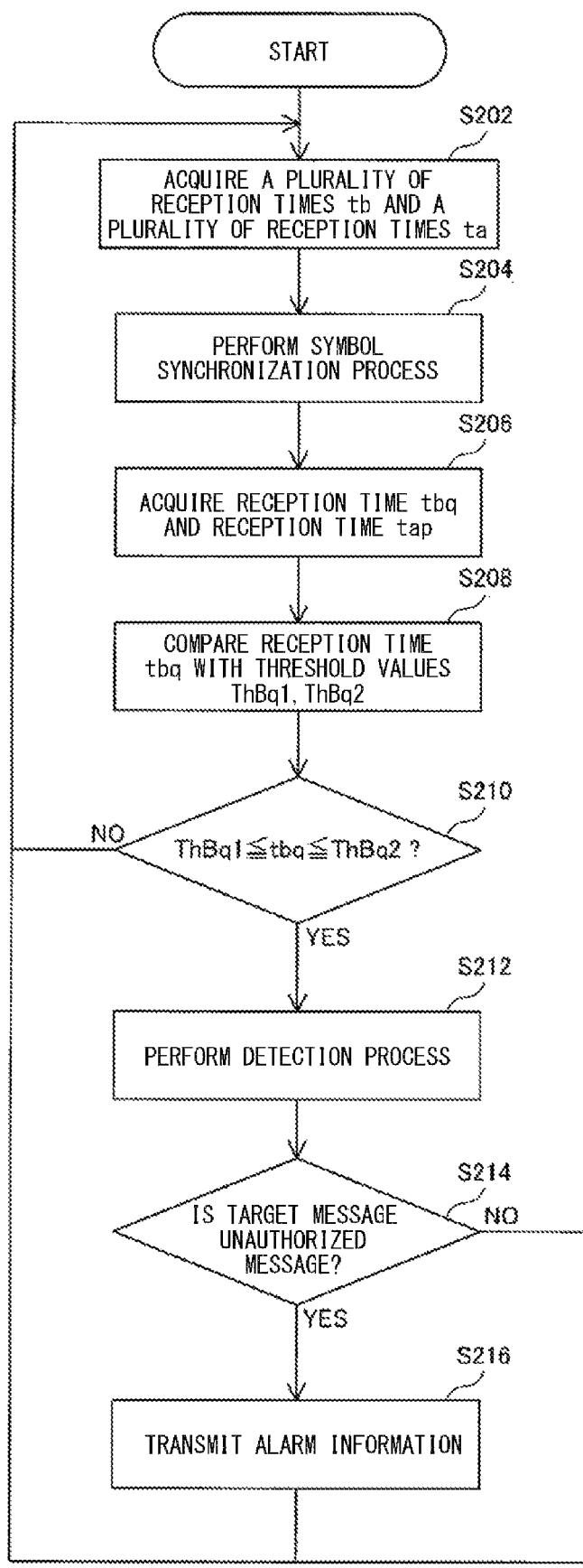
FIG. 17 is a flowchart of another example of an operation procedure when the gateway device performs a detection process in the in-vehicle communication system according to the embodiment of the present disclosure.

FIG. 17 is a flowchart showing another example of an operation procedure when the gateway device performs a detection process in the in-vehicle communication system according to the embodiment of the present disclosure.

With reference to FIG. 17, firstly, the gateway device 101 monitors target messages Ma and reference messages Mb in the in-vehicle network 12, and acquires a plurality of reception times of target messages Ma and a plurality of reception times tb of reference messages Mb (step S202).

Next, the gateway device 101 calculates a plurality of time differences Xp based on the plurality of reception times to and the plurality of reception times tb having been acquired, and performs a symbol synchronization process using the calculated plurality of time differences Xp (step S204).

Next, the gateway device 101 acquires a reception time tap of a target message Map and a reception time tbq of a reference message Mbq (step S206).

Next, the gateway device 101 compares the reception time tbq of the reference message Mbq with the threshold values ThBq1, ThBq2 (step S208).

When the reception time tbq is within an allowable range defined by the threshold values ThBq1, ThBq2 (YES in step S210), the gateway device 101 performs a detection process of detecting an unauthorized message. Specifically, the gateway device 101 determines whether or not the target message Map is an unauthorized message (step S212).

Next, the gateway device 101 performs, as processes in steps S214, S216, the same processes as in steps S110, S112 shown in FIG. 16.

Figure 18:
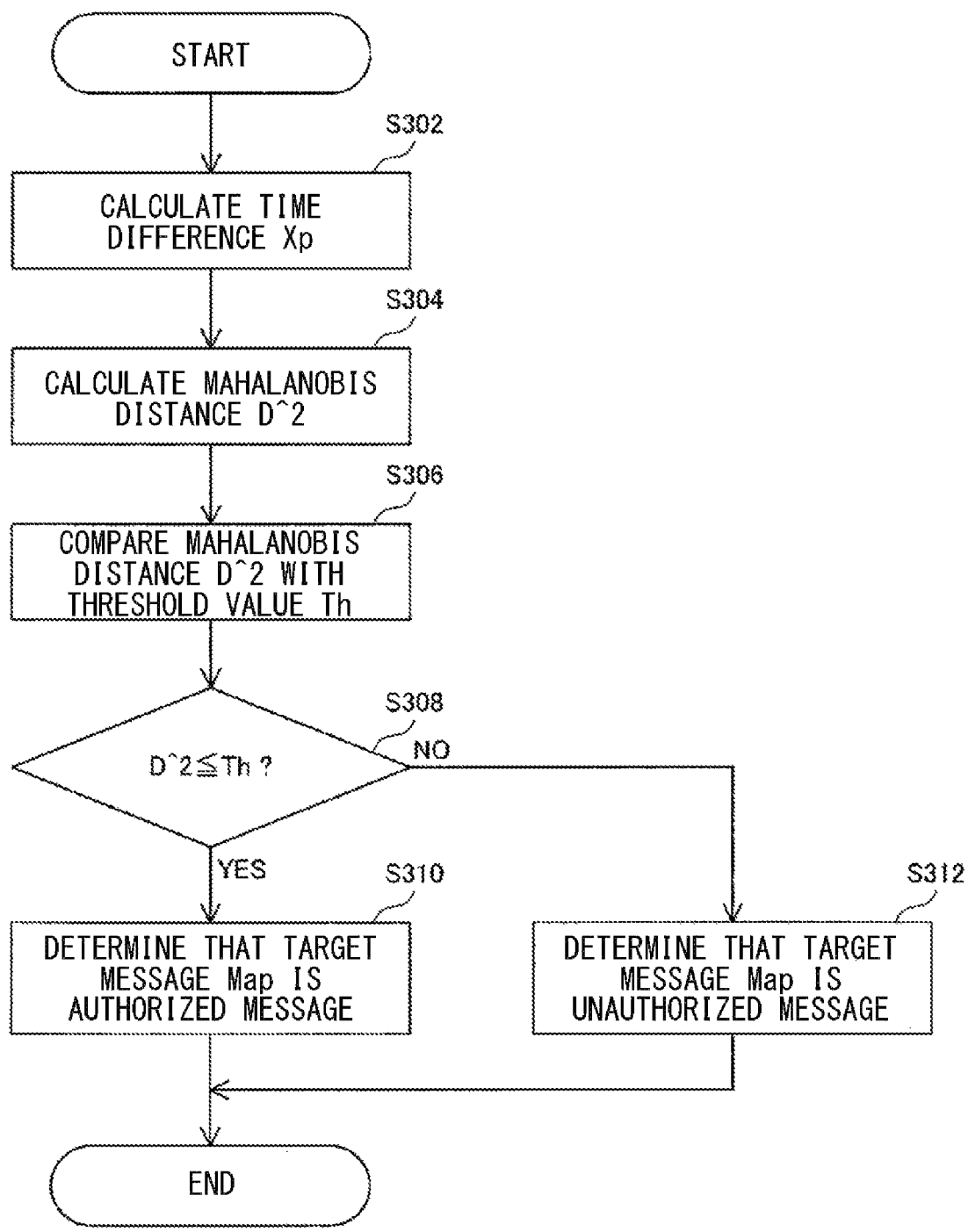
FIG. 18 is a flowchart of an example of a detection process in the gateway device of the in-vehicle communication system according to the embodiment of the present disclosure.

FIG. 18 is a flowchart of an example of a detection process in the gateway device in the in-vehicle communication system according to the embodiment of the present disclosure. FIG. 18 shows step S108 in FIG. 16 in more detail.

With reference to FIG. 18, firstly, the gateway device 101 calculates a time difference Xp between the reception time tap of the target message Map and the reception time tbq of the reference message Mbq (step S302).

Next, the gateway device 101 calculates a Mahalanobis distance $D^2$, based on the time difference Xp (step S304).

Next, the gateway device 101 compares the calculated Mahalanobis distance $D^2$ with a threshold value Th (step S306).

When the Mahalanobis distance $D^2$ is equal to or smaller than the threshold value Th (YES in step S308), the gateway device 101 determines that the target message Map is an authorized message (step S310).

Meanwhile, when the Mahalanobis distance $D^2$ is greater than the threshold value Th (NO in step S308), the gateway device 101 determines that the target message Map is an unauthorized message (step S312).

Figure 19:
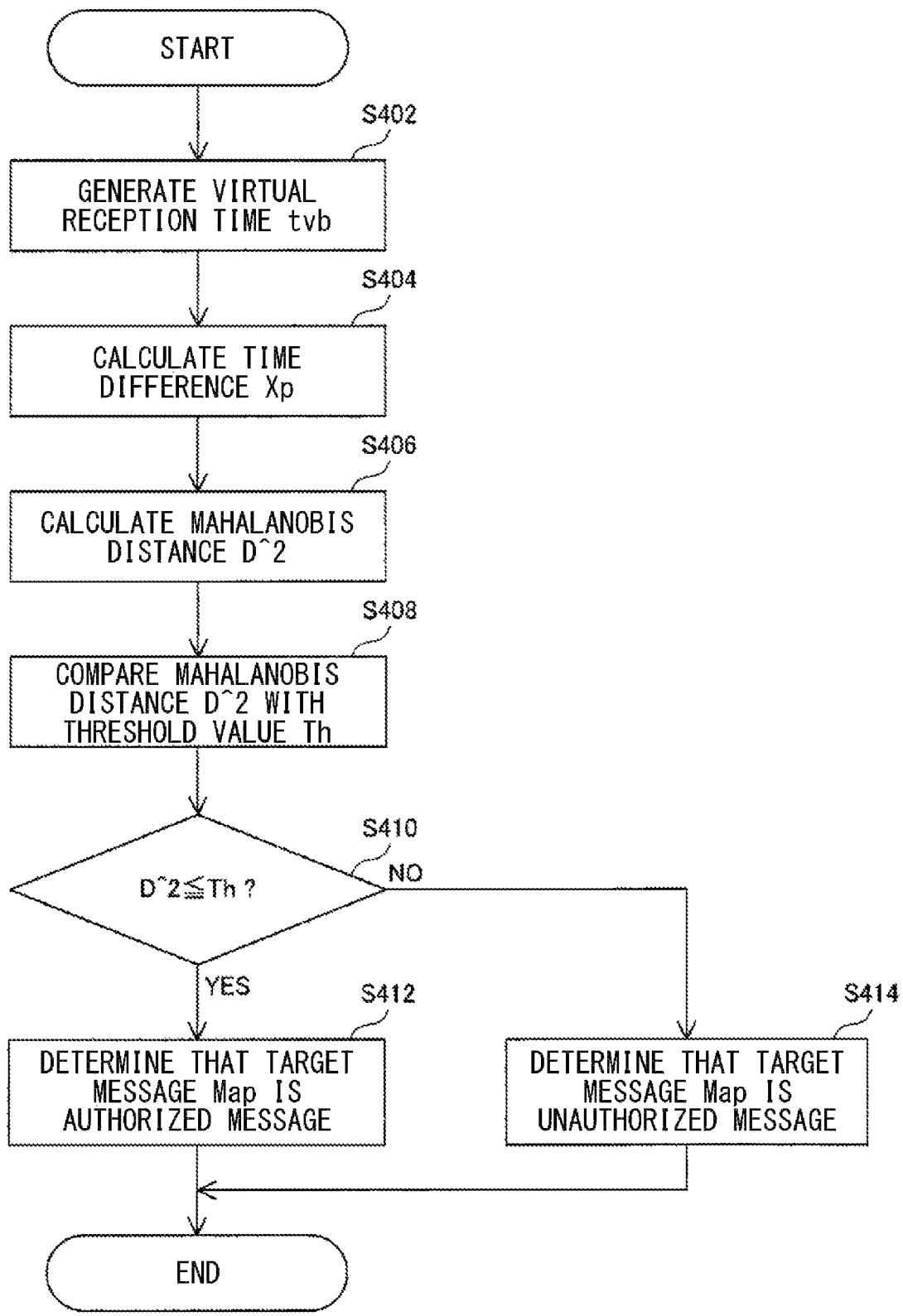
FIG. 19 is a flowchart of another example of a detection process in the gateway device of the in-vehicle communication system according to the embodiment of the present disclosure.

FIG. 19 is a flowchart of another example of a detection process in the gateway device in the in-vehicle communication system according to the embodiment of the present disclosure. FIG. 19 shows step S212 in FIG. 17 in more detail.

With reference to FIG. 19, firstly, the gateway device 101 generates a virtual reception time tvb, based on the reception time tbq of the reference message Mbq (step S402).

Next, the gateway device 101 calculates a time difference Xp between the reception time tap of the target message Map and the reception time tvb or the reception time tbq (step S404).

Next, the gateway device 101 performs, as processes in steps S406 to S414, the same processes as in steps S304 to S312 shown in FIG. 18.

In the in-vehicle communication system 301 according to the embodiment of the present disclosure, the gateway device 101 is configured to detect an unauthorized message in the in-vehicle network 12. However, the present disclosure is not limited thereto. In the in-vehicle communication system 301, a detection device different from the gateway device 101 may be configured to detect an unauthorized message in the in-vehicle network 12.

In the in-vehicle communication system 301 according to the embodiment of the present disclosure, the gateway device 101 that functions as a detection device is directly connected to the bus 13. However, the present disclosure is not limited thereto.

Figure 20:
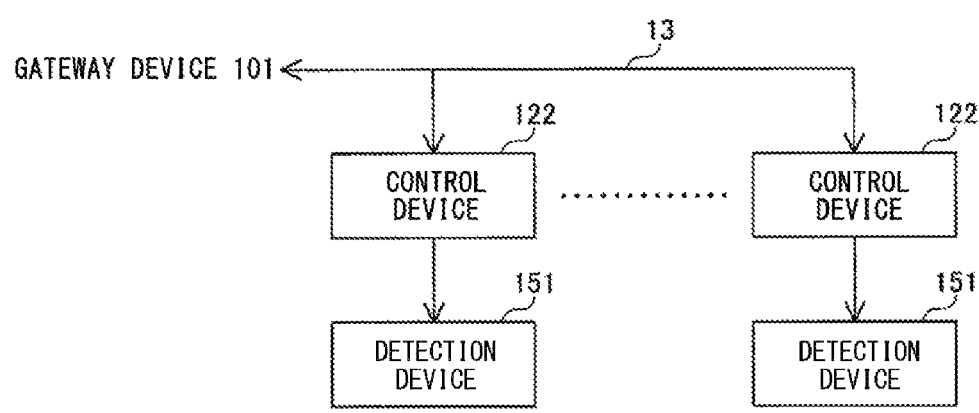
FIG. 20 shows an example of a connection topology of an in-vehicle network according to the embodiment of the present disclosure.

FIG. 20 shows an example of a connection topology of an in-vehicle network according to the embodiment of the present disclosure.

With reference to FIG. 20, a detection device 151 may be connected to a bus 13 via an in-vehicle device, e.g., a control device 122. In this case, for example, the detection device 151 detects an unauthorized message transmitted to the bus 13, by monitoring messages transmitted/received by the in-vehicle device.

In the example shown in FIG. 20, for example, a monitoring unit 52 of the detection device 151 acquires a time corresponding to a transmission time of a reference message Mb transmitted by the control device 122 and a time corresponding to a transmission time of a target message Ma transmitted by the control device 122. Then, a calculation unit 53 of the detection device 151 calculates a time difference between the transmission time of the target message Ma and the transmission time of the reference message Mb, based on a monitoring result of the monitoring unit 52.

In the in-vehicle communication system 301 according to the embodiment of the present disclosure, the gateway device 101 monitors, as target messages Ma, the periodic message M1 and an unauthorized message from the control device 122A, and monitors, as a reference message Mb, a periodic message M2 from the control device 122B. However, the present disclosure is not limited thereto.

Referring back to FIG. 4, for example, the control device 122A transmits the periodic message M1 in the transmission cycle Ta, and transmits the periodic message M2 in the transmission cycle Tb. More specifically, the CPU 132A in the control device 122A broadcasts or unicasts the periodic messages M1, M2 via the CAN transceiver 133A, according to timings of clocks generated based on oscillation signals from the oscillator 131A.

The CAN transceiver 142 in the gateway device 101 monitors, as target messages Ma, the periodic messages M1 and an unauthorized message from the control device 122A, and monitors, as the reference message Mb, the periodic message M2 from the control device 122A.

In the gateway device 101 according to the embodiment of the present disclosure, as the detection process, the detection unit 54 determines whether or not a target message Ma is an unauthorized message. However, the present disclosure is not limited thereto. As the detection process, the detection unit 54 may calculate a probability of a target message Ma being an unauthorized message.

In the gateway device 101 according to the embodiment of the present disclosure, the number of criteria to be used in the detection process by the detection unit 54 is determined based on the least common multiple L between the transmission cycle Ta of the target messages Ma and the transmission cycle Tb of the reference messages Mb and on the transmission cycle Ta of the target messages Ma in the case where all the target messages Ma are authorized messages. However, the present disclosure is not limited thereto. The number of criteria to be used in the detection process by the detection unit 54 may be a number independent of the least common multiple L and the transmission cycle Ta, for example, a predetermined number. In this case, determination as to whether or not a target message is an unauthorized message is performed for a part of the target messages Ma.

In the gateway device 101 according to the embodiment of the present disclosure, the abnormality detection unit 56 detects an abnormality of a reference message Mb, based on the monitoring result of the monitoring unit 52. However, the present disclosure is not limited thereto. The gateway device 101 may not necessarily include the abnormality detection unit 56.

In the gateway device 101 according to the embodiment of the present disclosure, in the case where the detection unit 54 has determined that a target message Map is not an unauthorized message and thereafter has further determined that a target message Ma(p+1) is not an unauthorized message, the detection unit 54 makes gray decision on the target messages Map, Ma(p+1). However, the present disclosure is not limited thereto. The detection unit 54 may not necessarily make gray decision.

In the gateway device 101 according to the embodiment of the present disclosure, a criterion as to whether or not a target message Ma is an unauthorized message is set based on jitters that are caused by the oscillators 131A, 131B in the control devices 122A, 122B and on a jitter that is caused by the oscillator 143 in the gateway device 101. However, the present disclosure is not limited thereto. The criterion may be set independently of the jitters caused by the oscillators 131A, 131B, and 143.

Incidentally, a technology enabling more accurate detection of an unauthorized message in an in-vehicle network has been desired.

For example, a method for detecting an unauthorized message impersonating an authorized periodic message while monitoring periodic messages is conceivable. In this method, such an unauthorized message is detected, with a periodic message transmitted at a certain time being a reference, based on a time difference between the transmission time of the periodic message and a transmission time of a periodic message transmitted next.

In this method, however, if the periodic message serving as the reference is an unauthorized message, whether or not the periodic message transmitted next is an unauthorized message cannot be accurately determined in some cases.

Specifically, in the above method in which whether or not a next periodic message is an unauthorized message is determined based on the transmission time of an immediately preceding periodic message, if an unauthorized message is erroneously detected as an authorized message, determination as to whether or not a next periodic message is an unauthorized message will be performed based on the transmission time of the unauthorized message. This may result in that a next unauthorized message is erroneously determined as an authorized message, or that an authorized message transmitted according to a predetermined transmission cycle is erroneously determined as an unauthorized message.

In contrast to the above method, in the gateway device 101 according to the embodiment of the present disclosure, the monitoring unit 52 monitors, as target messages Ma, an authorized message being periodically transmitted and an unauthorized message in the in-vehicle network 12, and also monitors a reference message Mb being periodically transmitted. The calculation unit 53, based on a monitoring result of the monitoring unit 52, calculates a time difference Xp between a time corresponding to a transmission time of a target message Ma and a time corresponding to a transmission time of a reference message Mb. The detection unit 54 performs a detection process for detecting an unauthorized message, based on the time difference Xp calculated by the calculation unit 53.

As described above, since the detection process is performed based on the time difference Xp between the time corresponding to the transmission time of the target message Ma and the time corresponding to the transmission time of the reference message Mb, the detection process can be performed using as a reference the time corresponding to the transmission time of the reference message Mb. Therefore, it is possible to avoid occurrence of erroneous detection due to the detection process performed using as a reference a reception time of an unauthorized message included in target messages Ma.

Therefore, in the gateway device 101 according to the embodiment of the present disclosure, it is possible to more accurately detect an unauthorized message in the in-vehicle network.

In the gateway device 101 according to the embodiment of the present disclosure, the transmission cycle of the authorized message and the transmission cycle Tb of the reference message Mb are different from each other. As the detection process, the detection unit 54 determines whether or not a target message Ma is an unauthorized message, according to a criterion. The detection unit 54 performs the detection process while switching a plurality of criteria.

In the above configuration, the detection process can be performed in response to change in the time difference Xp based on a difference between the transmission cycle of the authorized message and the transmission cycle Tb of the reference message Mb, while switching the plurality of criteria. Therefore, it is possible to realize a flexible detection process in which periodic messages in various transmission cycles can be used as reference messages Mb.

In the gateway device 101 according to the embodiment of the present disclosure, the number of criteria to be used by the detection unit 54 in the detection process is determined based on a least common multiple L between the transmission cycle of the authorized message and the transmission cycle Tb of the reference messages Mb, and on the transmission cycle of the authorized message.

In the above configuration, it is possible to determine whether or not a target message Ma is an unauthorized message, according to a plurality of criteria, in response to the magnitude of the time difference Xp based on the difference between the transmission cycle of the authorized message and the transmission cycle Tb of the reference message Mb. Therefore, for example, determination as to whether or not a target message is an unauthorized message can be performed for all the target messages Ma.

In the gateway device 101 according to the embodiment of the present disclosure, the abnormality detection unit 56 performs abnormality detection for a reference message Mb, based on the monitoring result of the monitoring unit 52, and when detecting an abnormality, performs a predetermined process.

In the above configuration, when an abnormality of a reference message Mb has been detected, for example, it is possible to prevent a detection process using as a reference the time corresponding to the transmission time of the reference message Mb from being performed, whereby occurrence of erroneous detection can be inhibited.

In the gateway device 101 according to the embodiment of the present disclosure, the detection unit 54 detects an abnormality regarding a target message Map on the basis of: a time difference Xp between a time corresponding to a transmission time of a target message Map and a time corresponding to a transmission time of a reference message Mbq; and a time difference X(p+1a) between a time corresponding to a transmission time of a target message Ma(p+1) transmitted after the target message Map and the time corresponding to the transmission time of the reference message Mbq.

In the above configuration, for example, in a case where a plurality of target messages Ma are transmitted within a time period in which the target messages Ma are determined to be normal using as a reference the time corresponding to the transmission time of the reference message Mbq, for example, even if the plurality of target messages Ma actually including an unauthorized message are erroneously determined as authorized messages, the detection unit 54 can determine that there is a possibility that the plurality of target messages Ma are abnormal. Thus, for example, gray decision can be made on the unauthorized message that could not be detected in the detection process.

In the gateway device 101 according to the embodiment of the present disclosure, the monitoring unit 52 monitors target messages Ma received by the gateway device 101 and reference messages Mb received by the gateway device 101. As the detection process, the detection unit 54 determines whether or not a target message Ma is an unauthorized message, according to a criterion. The criterion is set based on a jitter caused by the oscillator 131B in the control device 122B that transmits the reference messages Mb and on a jitter caused by the oscillator 143 in the gateway device 101.

In the above configuration, for example, a more accurate detection process can be performed based on the criterion taking into consideration an error, in the message transmission time, based on the jitter caused by the oscillator 131A in the control device 122A, and an error, in the message reception time, based on the jitter caused by the oscillator 143 in the gateway device 101.

The vehicle 1 according to the embodiment of the present disclosure is provided with the gateway device 101.

In the above configuration, in the vehicle 1 provided with the gateway device 101, an unauthorized message in the in-vehicle network 12 can be more accurately detected.

A detection method according to the embodiment of the present disclosure is a detection method performed in the gateway device 101 for detecting an unauthorized message in the in-vehicle network 12. In this detection method, firstly, the gateway device 101 monitors, as target messages Ma, authorized messages being periodically transmitted and unauthorized messages in the in-vehicle network 12, and also monitors reference messages Mb being periodically transmitted. Next, the gateway device 101, based on a monitoring result, calculates a time difference Xp between a time corresponding to a transmission time of a target message Ma and a time corresponding to a transmission time of a reference message Mb. Next, the gateway device 101 performs a detection process for detecting an unauthorized message, based on the calculated time difference Xp.

As described above, in the method of performing the detection process based on the time difference Xp between the time corresponding to the transmission time of the target message Ma and the time corresponding to the transmission time of the reference message Mb, the detection process can be performed using as a reference the time corresponding to the transmission time of the reference message Mb. Therefore, it is possible to avoid occurrence of erroneous detection due to the detection process performed using as a reference a reception time of an unauthorized message included in target messages Ma.

Therefore, in the detection method according to the embodiment of the present disclosure, it is possible to more accurately detect an unauthorized message in the in-vehicle network.

The above embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A detection device configured to detect an unauthorized message in an in-vehicle network, comprising:

a monitoring unit configured to monitor, as target messages, an authorized message being periodically transmitted and the unauthorized message in the in-vehicle network, and monitor a reference message being periodically transmitted;

a calculation unit configured to, based on a monitoring result of the monitoring unit, calculate a time difference between a time corresponding to a transmission time of the target message and a time corresponding to a transmission time of the reference message;

a detection unit configured to, based on the time difference calculated by the calculation unit, perform a detection process of detecting the unauthorized message; and an abnormality detection unit configured to detect an abnormality of the reference message, based on the monitoring result of the monitoring unit, and when detecting an abnormality, notify the calculation unit of the abnormality, wherein transmission sources or transmission destinations of the target message and the reference message are different from each other, and the calculation unit calculates the time difference, based on the time corresponding to the transmission time of the target message, and on the time corresponding to the transmission time of the reference message in which an abnormality has not been detected by the abnormality detection unit.

[Additional Note 2]

A detection device configured to detect an unauthorized message in an in-vehicle network, comprising:

a monitoring unit configured to monitor, as target messages, an authorized message being periodically transmitted and the unauthorized message in the in-vehicle network, and monitor a reference message being periodically transmitted;

a calculation unit configured to, based on a monitoring result of the monitoring unit, calculate a time difference between a time corresponding to a transmission time of the target message and a time corresponding to a transmission time of the reference message; and a detection unit configured to, based on the time difference calculated by the calculation unit, perform a detection process of detecting the unauthorized message, wherein the monitoring unit, the calculation unit, and the detection unit are each implemented by a processor.

REFERENCE SIGNS LIST

1 vehicle
12 in-vehicle network
13, 14 bus
51 communication processing unit
52 monitoring unit
53 calculation unit
54 detection unit
55 storage unit
56 abnormality detection unit
101 gateway device
111 in-vehicle communication device
112 port
121 bus connection device group
122 control device
131 oscillator
132 CPU
133 CAN transceiver
141 CPU
142 CAN transceiver
143 oscillator
151 detection device
301 in-vehicle communication system

The invention claimed is:

1. A detection device configured to detect an unauthorized message in an in-vehicle network, comprising a hardware processor configured to cause the detection device to perform operations comprising:

monitoring, as target messages, an authorized message being periodically transmitted and the unauthorized message in the in-vehicle network, and monitor a reference message being periodically transmitted;

calculating, based on a monitoring result, a time difference between a time corresponding to a transmission time of the target message and a time corresponding to a transmission time of the reference message; and performing, based on the calculated time difference, a detection process of detecting the unauthorized message, wherein the authorized message and the reference message have different transmission cycles, as the detection process, the performing includes determining whether or not the target message is an unauthorized message, according to a criterion, performing the detection process while switching a plurality of criteria, and a number of criteria to be used in the detection process is determined based on a least common multiple between the transmission cycle of the authorized message and the transmission cycle of the reference message, and on the transmission cycle of the authorized message.

2. The detection device according to claim 1, wherein the performing includes detecting an abnormality regarding a first target message on the basis of: a time difference between a time corresponding to a transmission time of the first target message that is the target message and the time corresponding to the transmission time of the reference message; and a time difference between a time corresponding to a transmission time of a second target message that is the target message transmitted after the first target message and the time corresponding to the transmission time of the reference message.

3. The detection device according to claim 1, wherein the monitoring includes monitoring the target message received by the detection device and the reference message received by the detection device, as the detection process, the detecting includes determining whether or not the target message is an unauthorized message, according to a criterion, and the criterion is set based on a jitter caused by an oscillator in an in-vehicle device that transmits the reference message, and on a jitter caused by an oscillator in the detection device.

4. The detection device according to claim 1, wherein the operation further comprises detecting an abnormality of the reference message, based on the monitoring result, and when detecting the abnormality, performing a predetermined process.

5. A detection method performed in a detection device configured to detect an unauthorized message in an in-vehicle network, the method comprising:
- monitoring, as target messages, an authorized message being periodically transmitted and the unauthorized message in the in-vehicle network, and monitoring a reference message being periodically transmitted;
- based on a monitoring result, calculating a time difference between a time corresponding to a transmission time of the target message and a time corresponding to a transmission time of the reference message; and
- based on the calculated time difference, performing a detection process of detecting the unauthorized message, wherein
- the authorized message and the reference message have different transmission cycles,
- as the detection process, the performing includes determining whether or not the target message is an unauthorized message, according to a criterion,
- performing the detection process while switching a plurality of criteria, and
- a number of criteria to be used in the detection process is determined based on a least common multiple between the transmission cycle of the authorized message and the transmission cycle of the reference message, and on the transmission cycle of the authorized message.

6. A computer-readable non-transitory storage medium having stored therein a detection program used in a detection device configured to detect an unauthorized message in an in-vehicle network, the program causing a computer to execute steps comprising:
- monitoring, as target messages, an authorized message being periodically transmitted and the unauthorized message in the in-vehicle network, and monitor a reference message being periodically transmitted;
- calculating, based on a monitoring result, a time difference between a time corresponding to a transmission time of the target message and a time corresponding to a transmission time of the reference message; and
- performing, based on the calculated time difference, a detection process of detecting the unauthorized message, wherein
- the authorized message and the reference message have different transmission cycles,
- as the detection process, the performing includes determining whether or not the target message is an unauthorized message, according to a criterion,
- performing the detection process while switching a plurality of criteria, and
- a number of criteria to be used in the detection process is determined based on a least common multiple between the transmission cycle of the authorized message and the transmission cycle of the reference message, and on the transmission cycle of the authorized message.

7. A vehicle being provided with the detection device according to claim 1.

* * * * *